United States Patent
Nagasaka et al.

(10) Patent No.: US 10,487,164 B2
(45) Date of Patent: Nov. 26, 2019

(54) AUTOMOBILE INTERIOR PART WITH REDUCED SQUEAKING NOISES

(75) Inventors: Masahiko Nagasaka, Mie (JP); Masaki Maeda, Tokyo (JP); Isamu Mochizuki, Tokyo (JP); Kazuya Egawa, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 0 days.

(21) Appl. No.: 13/262,395

(22) PCT Filed: Apr. 7, 2010

(86) PCT No.: PCT/JP2010/056324
§ 371 (c)(1),
(2), (4) Date: Sep. 30, 2011

(87) PCT Pub. No.: WO2010/117020
PCT Pub. Date: Oct. 14, 2010

(65) Prior Publication Data
US 2012/0034467 A1    Feb. 9, 2012

(30) Foreign Application Priority Data

| Apr. 8, 2009 | (JP) | 2009-093801 |
| Jan. 29, 2010 | (JP) | 2010-017964 |
| Feb. 5, 2010 | (JP) | 2010-023843 |

(51) Int. Cl.
| C08L 51/06 | (2006.01) |
| C08F 212/12 | (2006.01) |
| C08L 23/16 | (2006.01) |
| C08L 25/16 | (2006.01) |
| B60H 1/00 | (2006.01) |

(52) U.S. Cl.
CPC ............ *C08F 212/12* (2013.01); *C08L 23/16* (2013.01); *C08L 25/16* (2013.01); *C08L 51/06* (2013.01);
(Continued)

(58) Field of Classification Search
CPC ............................................................
H01L 51/0038; H01L 51/5012; H01L 51/52; H01L 51/5206; H01L 51/5221;
(Continued)

(56) References Cited

U.S. PATENT DOCUMENTS

| 6,284,833 B1 * | 9/2001 | Ford et al. ............... 524/515 |
| 2006/0145504 A1 * | 7/2006 | Augustyniak ............ 296/37.12 |
| 2010/0212813 A1 * | 8/2010 | Mozer et al. ............. 156/160 |

FOREIGN PATENT DOCUMENTS

| EP | 1956043 A1 * | 8/2008 |
| EP | 2085425 A1 * | 8/2009 |

(Continued)

OTHER PUBLICATIONS

Machine translation of JP 2002-020574 A, retrieved Feb. 16, 2013.*
(Continued)

*Primary Examiner* — Callie E Shosho
*Assistant Examiner* — Krupa Shukla
(74) *Attorney, Agent, or Firm* — Kratz, Quintos & Hanson, LLP (57) ABSTRACT

An automobile interior part made of a thermoplastic resin composition [D] prepared by incorporating 0.1 to 8 parts by mass of a silicone oil [B] having a kinematic viscosity at 25° C. of 10 to 100,000 cSt into 100 parts by mass of a rubber-reinforced vinyl resin [A], wherein [A] contains a diene rubber polymer [a1] and an ethylene-α-olefin rubber polymer [a2], the total amount of [a1] and [a2] is 5 to 30% by mass, and the mass ratio of [a1] to [a2], [a1]: [a2], is 10 to 85 : 90 to 15. The automobile interior part shows remarkably reduced generation of squeaking noises when members rub against each other, and this effect is maintained without deterioration even when being placed under high temperatures for a long time. The automobile interior part is also superior in impact resistance and molded appearance.

14 Claims, 1 Drawing Sheet

(51) Int. Cl.
    *C08L 51/04*        (2006.01)
    *C08L 83/04*        (2006.01)
(52) U.S. Cl.
    CPC ........ *B60H 2001/006* (2013.01); *C08L 51/04* (2013.01); *C08L 83/04* (2013.01); *Y10T 428/31507* (2015.04); *Y10T 428/31909* (2015.04)
(58) Field of Classification Search
    CPC ...................................................................
        H01F 10/08; H01F 41/14; H01F 1/01; B82Y 25/00; G01R 33/093; G01R 33/1269; G01R 33/1284; C09K 11/06; C08G 61/02; C07B 2200/05; C07B 59/00
    USPC .......... 324/200, 207.21; 257/421, 40; 438/3; 365/158, 209; 428/810, 811.2, 457, 828, 428/827, 461, 704, 690, 917; 427/128; 313/504, 506, 505; 252/301.16, 301.35; 549/212
    See application file for complete search history.

(56) References Cited

FOREIGN PATENT DOCUMENTS

| | | |
|---|---|---|
| JP | 4-293934 | 10/1992 |
| JP | 2659467 | 9/1997 |
| JP | 2688619 | 12/1997 |
| JP | 10-60221 | 3/1998 |
| JP | 2798396 | 9/1998 |
| JP | 63-56267 | 11/1998 |
| JP | 10-316833 | 12/1998 |
| JP | 2000119477 A * | 4/2000 |
| JP | 2002-20574 A1 | 1/2002 |
| JP | 2002020574 A * | 1/2002 |
| JP | 2004107400 A * | 4/2004 |
| WO | WO 2006/126606 A1 | 11/2006 |
| WO | WO 2007/063732 A1 | 6/2007 |

OTHER PUBLICATIONS

Machine translation of JP 2000119477 A, retrieved Mar. 19, 2014.*
Machine translation of JP 2004107400 A, retrieved Mar. 19, 2014.*
Derwent Document of 2004107400 A, retrieved Mar. 19, 2014.*
International Search Report for International Application No. PCT/JP2010/056324 dated Jul. 5, 2010.
Hiroshi Matsukawa, "Physics of Friction," Journal of Surface Science Society of Japan, 2003, vol. 24, No. 6, pp. 328-333, Abstract only.

* cited by examiner

AUTOMOBILE INTERIOR PART WITH REDUCED SQUEAKING NOISES

TECHNICAL FIELD

The present invention relates to automobile interior parts, and more particularly, to an automobile interior part made of a thermoplastic resin composition, the automobile interior part having been remarkably reduced in squeaking noises caused by coming into contact with and rubbing against other parts.

BACKGROUND ART

ABS resin is widely used for the production of automobile interior parts due to its superior mechanical properties, heat resistance, and moldability.

However, with vibration during car driving, when automobile interior parts made of ABS resin come into contact with and rub against each other or such a part comes into contact with and rubs against another part such as a lining sheet or a foam made of polyvinyl chloride, chloroprene rubber, polyurethane, natural rubber, polyester, or polyethylene, squeaking noises (rubbing noises) may be generated. For example, in a ventilator made of ABS resin is installed a valve shutter using a chloroprene rubber foam or the like as a sealing material in order to adjust an air quantity. If the valve shutter is rotated for air quantity adjustment, a case of the ventilator made of the ABS resin rubs against another member e.g., a case of the sealing material, so that squeaking noises may be generated.

Figure 1:
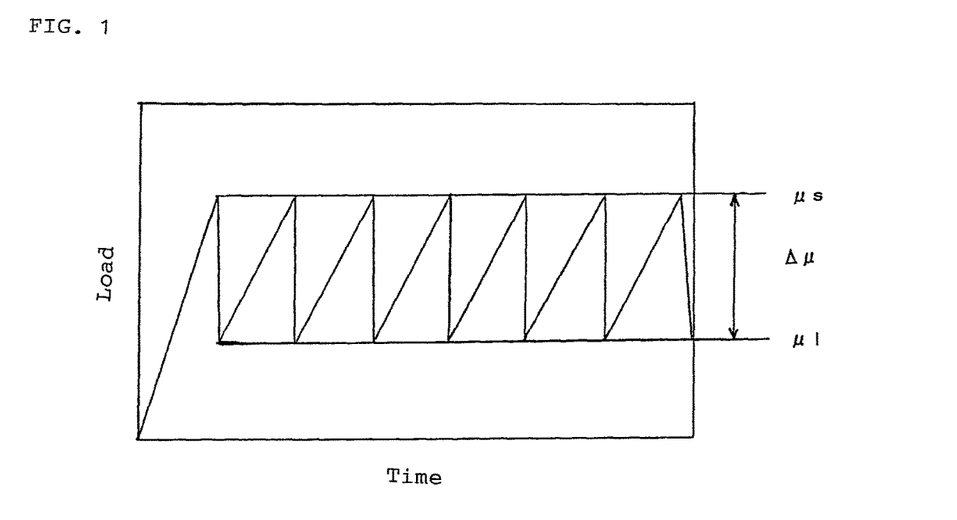
FIG. 1 is an explanatory diagram of a stick slip phenomenon.
Figure 2:
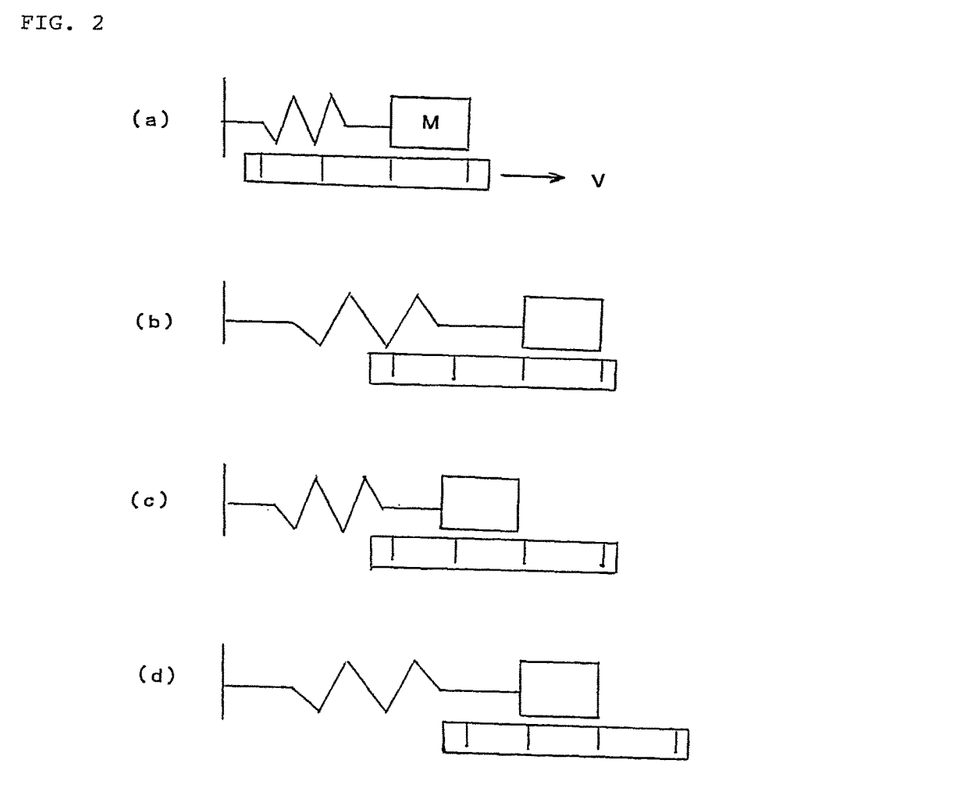

Moreover, since ABS resin and ASA resin are amorphous resins, they are higher in coefficient of friction as compared with crystalline resins such as polyethylene, polypropylene and polyacetal, and it is well known that, like an air outlet of an air conditioner in an automobile or buttons of a car audio system, when fitting with a member made of another resin, a stick slip phenomenon as illustrated in FIG. 1 occurs to generate squeaking noises because of a large coefficient of friction. The stick slip phenomenon is a phenomenon that is generated when two objects rub against each other. When an object M connected with a spring is placed on a driving table that moves at a driving speed V as illustrated by a model of FIG. 2(a), the object M moves toward the right direction first as illustrated in FIG. 2(b) together with the table moving at the driving speed V by the action of a static frictional force. When the force by which the object M is to be restored to its original position becomes equal to the static frictional force, the object M starts to slip in the opposite direction to the driving speed V. At this time, the object M comes to receive a kinematic frictional force, and the slip is stopped when the force of the spring becomes equal to the kinematic frictional force as illustrated in FIG. 2(c), so that the object M comes again into a state where it attaches on the driving table and it moves again in the same direction as the driving speed V (FIG. 2(d)). A stick slip phenomenon refers to a phenomenon that when making an object slip as described above, the object repeats sticking and slipping, and the object M receives a time-varying load as illustrated in FIG. 1. It has been argued that if the difference $\Delta\mu$ between the coefficient of static friction $\mu s$ of FIG. 1 (at the time of FIG. 2 (b)) and the lower end of a saw wavy form $\mu l$ (at the time of FIG. 2 (c)) is large, squeaking noises are generated easily. A dynamic friction coefficient is a middle value between $\mu s$ and $\mu l$.

Such a squeaking noise is a major cause that spoils comfortableness and silence when riding a car, and therefore reduction of squeaking noises is demanded strongly.

On the other hand, it is known that the stick slip phenomenon occurs remarkably when the friction velocity dependency of a coefficient of friction determined on the basis of the Amonton-Coulomb's law takes a negative value (see non-patent document 1), and it is possible to inhibit the occurrence of the stick slip phenomenon and reduce the generation of squeaking noises by bringing the friction velocity dependency of the coefficient of friction close to zero or by adjusting it to a positive value greater than zero.

Then, in order to prevent such squeaking noises, a method of applying Teflon (registered trademark) coating to the surface of a member, a method of mounting a Teflon (registered trademark) tape, a method of applying a silicone oil, etc. have been performed. However, the step of mounting or applying is very complicated and requires time and effort, and there is a problem that the effect does not continue when being placed under high temperatures for a long time.

As a method for changing the properties of the material to be used for an automobile interior part, a method of incorporating a silicone oil into an ABS resin and a method of incorporating an epoxy-containing olefin copolymer into an ABS resin have been proposed. For example, there have been disclosed a technology of incorporating an organosilicon compound into a resin composed of a polycarbonate resin and an ABS resin (see patent document 1), a technology of incorporating a flame retardant, a flame retarding aid and a silicone oil into an ABS resin (see patent document 2), a technology of incorporating a silicone oil into an ABS resin, an MBS resin, and a HIPS (high impact polystyrene) resin (see patent document 3), a technology of incorporating an alkane sulfonate surfactant into an ABS resin (see patent document 4), and a technology of incorporating a modified polyorganosiloxane having at least one reactive group selected from among an epoxy group, a carboxyl group and an acid anhydride group into an ABS resin to increase water repellency and using the same as a wet area part in a bathroom or toilet (see patent document 5).

However, an effect of reducing squeaking noises obtained by these methods is not sufficient. Even if the effect of preventing squeaking noises is considerably exhibited just after molding, the durability of the effect is poor, and in particular, there is a problem that the effect deteriorates remarkably when being placed under high temperatures for a long time.

PRIOR ART DOCUMENTS

Patent Documents

Patent document 1: Japanese Examined Publication 63 (1988)-56267
Patent document 2: Japanese Patent No. 2798396
Patent document 3: Japanese Patent No. 2688619
Patent document 4: Japanese Patent No. 2659467
Patent document 5: Japanese Laid-open Publication 10 (1998)-316833

Non-Patent Documents

Non-patent document 1: Journal of The Surface Science of Japan, Vol. 24, No. 6, PP. 328-333, 2003

DISCLOSURE OF THE INVENTION

Problem to be Solved by the Invention

In view of such situations, an object of the present invention is to provide an automobile interior part made of a thermoplastic resin composition, the automobile interior part being characterized in that generation of squeaking noises that are generated when members rub against each other is remarkably reduced, that an effect of reducing squeaking noises is maintained without deterioration even when being placed under high temperatures for a long time, and that the automobile interior part is superior in impact resistance.

Solutions to the Problems

The present inventors have made an extensive series of studies in order to solve the above-described problems and, as a result, they found that by incorporating a specific amount of a specific silicone oil into a specific rubber-modified vinyl resin, there can be obtained an automobile interior part made of a thermoplastic resin composition, the automobile interior part being characterized in that generation of squeaking noises is remarkably reduced, that an effect of reducing squeaking noises is maintained without deterioration even when being placed under high temperatures for a long time, and that the automobile interior part is superior in impact resistance.

According to the present invention, the following automobile interior parts are provided.

1. An automobile interior part made of a thermoplastic resin composition [D] prepared by incorporating 0.1 to 8 parts by mass of a silicone oil [B] having a kinematic viscosity at 25° C. of 10 to 100,000 cSt into 100 parts by mass of a rubber-reinforced vinyl resin [A], wherein:
the rubber-reinforced vinyl resin [A] contains a diene rubber polymer [a1] and an ethylene-α-olefin rubber polymer [a2],
the total amount of the diene rubber polymer [a1] and the ethylene-α-olefin rubber polymer [a2] is 5 to 30% by mass, provided that the whole amount of the rubber-reinforced vinyl resin [A] is taken as 100% by mass, and
the mass ratio of the diene rubber polymer [a1] to the ethylene-α-olefin rubber polymer [a2], [a1]:[a2], is 10 to 85:90 to 15.

2. The automobile interior part according to the above item 1, wherein the rubber-reinforced vinyl resin [A] contains a mixture composed of a rubber-reinforced vinyl resin [A1] obtained by polymerizing a vinyl monomer [b1] in the presence of the diene rubber polymer [a1], a rubber-reinforced vinyl resin [A2] obtained by polymerizing a vinyl monomer [b2] in the presence of the ethylene-α-olefin rubber polymer [a2], and a (co)polymer [C] of a vinyl monomer [b3].

3. The automobile interior part according to the above item 1 or 2, wherein the mass ratio of ethylene to α-olefin of the ethylene-α-olefin rubber polymer [a2] is 5 to 95:95 to 5.

4. The automobile interior part according to any one of the above items 1 to 3, wherein the ethylene-α-olefin rubber polymer [a2] is an ethylene-propylene copolymer.

5. The automobile interior part according to any one of the above items 1 to 4, wherein the silicone oil [B] is at least one silicone oil selected from the group consisting of methylphenyl silicone oil, an alkyl/aralkyl-modified silicone oil and an amino-modified silicone oil.

6. The automobile interior part according to the above item 5, wherein the silicone oil [B] is methylphenyl silicone oil.

7. The automobile interior part according to any one of the above items 1 to 6, wherein a molded article of the thermoplastic resin composition [D] and a molded article of a thermoplastic resin [Y] selected from the group consisting of the following Y1 to Y4 have been assembled in contact with each other:
Y1: a polycarbonate/rubber-reinforced styrene resin alloy having an HDT of 85° C. or higher,
Y2: a styrene resin having an HDT of 85° C. or higher (excluding the above Y1),
Y3: a polyolefin resin having an HDT of 85° C. or higher,
Y4: a methacrylic resin having an HDT of 85° C. or higher.

8. The automobile interior part according to any one of the above items 1 to 7 to be used in a ventilator for an automobile.

9. The automobile interior part according to any one of the above items 1 to 7 to be used in an air-conditioner for an automobile.

Advantageous Effects of the Invention

According to the present invention, incorporation of a specific amount of a specific silicone oil into a specific rubber-modified vinyl resin makes it possible to obtain such an automobile interior part made of a thermoplastic resin composition that squeaking noises produced when parts rub against each other are reduced remarkably and that the effect of reducing squeaking noises does not deteriorate even when being placed at high temperatures for a long time.

In particular, by incorporating a specific modified silicone oil, it is possible to obtain an automobile interior part that is more superior in the effect of reducing squeaking noises and superior in impact resistance and molded appearance.

Moreover, an automobile interior part in which a molded article made of the thermoplastic resin composition of the present invention and a molded article made of a specific thermoplastic resin have been assembled to be in contact with each other is remarkably reduced in an effect of reducing squeaking noises and it is continued without being deteriorated in the effect of reducing squeaking noises even when being placed under high temperatures for a long time. Furthermore, it is superior in impact resistance and molded appearance.

BRIEF DESCRIPTION OF THE DRAWINGS

FIG. 2(a), (b), (c) and (d) are model diagrams of a stick slip.

EMBODIMENTS OF THE INVENTION

The present invention will be described in more detail below. The thermoplastic resin composition [D] that forms the automobile interior part in the present invention comprises:
100 parts by mass of a rubber-reinforced vinyl resin [A], and
0.1 to 8 parts by mass of a silicone oil [B] having a kinematic viscosity at 25° C. of 10 to 100,000 cSt, wherein:

the rubber-reinforced vinyl resin [A] comprises a diene rubber polymer [a1] and an ethylene-α-olefin rubber polymer [a2], a total amount of the diene rubber polymer [a1] and the ethylene-α-olefin rubber polymer [a2] is 5 to 30% by mass, based on 100% by mass of the whole amount of the rubber-reinforced vinyl resin [A], and a mass ratio of the diene rubber polymer [a1] to the ethylene-α-olefin rubber polymer [a2], [a1]:[a2], is 10 to 85:90 to 15.

As used herein, "(co)polymerization" means homopolymerization and copolymerization, "(meth)acrylic" means acrylic and/or methacrylic, and "(meth)acrylate" means acrylate and/or methacrylate.

1. Rubber-Reinforced Vinyl Resin [A] (Henceforth Referred to also as "Component [A]"):

Component [A] to be used in the present invention is a rubber-reinforced vinyl resin made of a mixture composed of a rubber-reinforced vinyl resin [A1] obtained by polymerizing a vinyl monomer [b1] in the presence of a diene rubber polymer [a1], a rubber-reinforced vinyl resin [A2] obtained by polymerizing a vinyl monomer [b2] in the presence of the ethylene-α-olefin rubber polymer [a2], and, as necessary, a (co)polymer [C] of a vinyl monomer [b3]. The (co)polymer [C] is obtained by polymerizing a vinyl monomer [b3] in the absence of a rubber polymer.

1-1. Diene Rubber Polymer [a1] (Henceforth Referred to also as "Component [a1]);

Examples of the diene rubber polymer [a1] include homopolymers such as polybutadiene and polyisoprene; butadiene-based copolymers such as a styrene-butadiene copolymer, a styrene-butadiene-styrene copolymer, an acrylonitrile-styrene-butadiene copolymer and an acrylonitrile-butadiene copolymer; isoprene-based copolymers such as a styrene-isoprene copolymer, a styrene-isoprene-styrene copolymer and an acrylonitrile-styrene-isoprene copolymer. These may be either random copolymers or block copolymers, and two or more of them may be used in combination. The diene rubber polymer [a1] may be either a cross-linked polymer or a non-cross-linked polymer.

1-2. Ethylene-α-Olefin Rubber Polymer [a2] (Henceforth Referred to also as "Component [a2]);

Examples of the ethylene-α-olefin rubber polymer [a2] include an ethylene-α-olefin copolymer, and an ethylene-α-olefin-nonconjugated diene copolymer. Examples of the α-olefin to constitute the component [a2] include α-olefins having 3 to 20 carbon atoms and specifically include propylene, 1-butene, 1-pentene, 1-hexene, 4-methyl-1-pentene, 1-heptene, 1-octene, 1-decene, 1-dodecene, 1-hexadecene and 1-eicocene. These α-olefins may be used alone or as a mixture of two or more. The number of carbon atoms of the α-olefin is preferably 3 to 20, more preferably 3 to 12, and even more preferably 3 to 8. If the number of carbon atoms exceeds 20, the surface appearance of a molded article may become insufficient due to deterioration in copolymerizability. The mass ratio of ethylene:α-olefin is usually 5 to 95:95 to 5, preferably 50 to 90:50 to 10, and more preferably 60 to 88:40 to 12. If the mass ratio of the α-olefin exceeds 95, weatherability is insufficient, whereas if it is less than 5, sufficient impact resistance may not be provided because the rubber elasticity of a rubber polymer becomes insufficient.

Among those, an ethylene-α-olefin copolymer is preferred from the viewpoint of squeaking noise reduction, and an ethylene-propylene copolymer is particularly preferred.

Examples of the nonconjugated diene include alkenylnorbornenes, cyclic dienes and aliphatic dienes, and among those, 5-ethylidene-2-norbornene and dicyclopentadiene are preferred. These nonconjugated dienes can be used singly or in combination of two or more. The proportion of the nonconjugated diene to the whole amount of the rubber polymer is usually 0 to 30% by mass, preferably 0 to 20% by mass, and more preferably 0 to 10% by mass. When the proportion of the nonconjugated diene exceeds 30% by mass, molded appearance and weatherability may become insufficient. The amount of unsaturated groups in the component [a1] is preferably within the range of from 4 to 40 in terms of iodine value. If the iodine value exceeds 40, the molded appearance and the weatherability of a molded article may become insufficient, whereas if the iodine value becomes less than 4, the impact resistance of a molded article may become insufficient.

The Mooney viscosity ($ML_{1+4}$, at 100° C.; in accordance with JIS K6300) of the component [a2] is usually 5 to 80, preferably 10 to 65, and more preferably 15 to 45. If the Mooney viscosity exceeds 80, the flowability of an obtained rubber-reinforced vinyl resin may become insufficient, whereas if the Mooney viscosity becomes less than 5, the impact resistance of an obtained molded article may become insufficient.

The ethylene-α-olefin rubber polymer [a2] also includes a polymer prepared by hydrogenating a block (co)polymer obtained by using a conjugated diene compound such as butadiene and isoprene (it is preferred in terms of weatherability that the hydrogenation ratio of the double bonds of the conjugated diene portions of the polymer is 90% or more). The polymer may be either a cross-linked polymer or a non-cross-linked polymer.

1-3. Vinyl Monomer [b1] to [b3]:

The vinyl monomers [b1], [b2] and [b3] each may, without any particular limitations, be any polymerizable compound having an unsaturated bond. The vinyl monomers [b1], [b2] and [b3] each usually contain an aromatic vinyl compound and a vinyl cyanide compound. If necessary, other copolymerizable vinyl monomers such as (meth)acrylic acid ester and maleimide compounds, and functional group-containing vinyl monomers having one or more functional groups such as a carboxyl group, an anhydride group, a hydroxyl group, an amino group, an amide group, an epoxy group and an oxazoline group may be used together. The vinyl monomers [b1] and [b2] to be used for forming the rubber-reinforced vinyl resins [A1] and [A2] may be either the same as or different from each other.

The vinyl monomer [b3] to be used for forming the (co)polymer [C] may be either the same as or different from the vinyl monomer [b1] and/or [b2].

As the aforementioned aromatic vinyl compound, any compound having at least one vinyl bond and at least one aromatic ring can be used without any particular limitations. Examples thereof include styrene, α-methylstyrene, o-methylstyrene, p-methylstyrene, vinyltoluene, β-methylstyrene, ethylstyrene, p-tert-butylstyrene, vinylxylene, vinylnaphthalene, monochlorostyrene, dichlorostyrene, monobromostyrene, dibromostyrene and fluorostyrene. These may be used singly or in combination of two or more. Among these, styrene and α-methylstyrene are preferred.

Examples of the aforementioned vinyl cyanide compound include acrylonitrile and methacrylonitrile. These may be used singly or in combination of two or more. Among these, acrylonitrile is preferred.

Examples of the aforementioned (meth)acrylic acid ester include acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, phenyl acrylate and benzyl acrylate; and methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, dodecyl methacrylate, octadecyl methacrylate, cyclohexyl methacrylate, phenyl methacrylate and benzyl methacrylate. These may be used singly or in combination of two or more. Among these, methyl methacrylate is preferred.

Examples of the aforementioned maleimide compound include maleimide, N-methylmaleimide, N-butylmaleimide, N-cyclohexylmaleimide, and N-phenylmaleimide. These may be used singly or in combination of two or more. Among these, N-cyclohexylmaleimide and N-phenylmaleimide are preferred.

As a method for introducing a monomer unit composed of the maleimide compound into a polymer, maleic anhydride in copolymerized beforehand and then imidation is conducted.

Among the aforementioned functional group-containing vinyl monomers, examples of unsaturated compounds having a carboxyl group include acrylic acid, methacrylic acid, ethacrylic acid, maleic acid, fumaric acid, itaconic acid, crotonic acid and cinnamic acid. These may be used singly or in combination of two more.

Examples of the unsaturated compound having an acid anhydride group include maleic anhydride, itaconic anhydride and citraconic anhydride. These may be used singly or in combination of two or more.

Examples of the unsaturated compound having a hydroxyl group include hydroxystyrene, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and N-(4-hydroxyphenyl)maleimide. These may be used singly or in combination of two or more.

Examples of the unsaturated compound having an amino group include aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminomethyl methacrylate, 2-dimethylaminoethyl methacrylate, phenylaminoethyl methacrylate, p-aminostyrene, N-vinyldiethylamine, N-acetylvinylamine, acrylic amine, methacrylic amine and N-methylacrylic amine. These may be used singly or in combination of two or more.

Examples of the unsaturated compound having an amide group include acrylamide, N-methylacrylamide, methacrylamide and N-methylmethacrylamide. These may be used singly or in combination of two or more.

Examples of the unsaturated compound having an epoxy group include glycidyl acrylate, glycidyl methacrylate and allyl glycidyl ether. These may be used singly or in combination of two or more.

Examples of the unsaturated compound having an oxazoline group include vinyl oxazoline. These may be used singly or in combination of two or more.

While the types and the used amounts of the vinyl monomers [b1], [b2] and [b3] are chosen according to the purpose, application, and so on, the total amount of the aromatic vinyl compound and the vinyl cyanide compound is usually 30 to 100% by mass, preferably 50 to 100% by mass, and more preferably 70 to 100% by mass based on 100% by mass of the whole portion of the vinyl monomer. The content of the aforementioned other copolymerizable vinyl monomer is usually 0 to 70% by mass, preferably 0 to 50% by mass, and more preferably 0 to 30% by mass based on 100% by mass of the whole portion of the vinyl monomer. The content of the aforementioned functional group-containing vinyl monomer is usually 0 to 40% by mass, preferably 0 to 30% by mass, and more preferably 0 to 20% by mass based on 100% by mass of the whole portion of the vinyl monomer. The use ratio of the aromatic vinyl compound to the vinyl cyanide compound (aromatic vinyl compound/vinyl cyanide compound) is usually 40 to 85% by mass/15 to 60% by mass, and preferably 45 to 85% by mass/15 to 55% by mass, provided that the total amount of these compounds is taken as 100% by mass.

1-4. Method for Producing of the Rubber-Reinforced Vinyl Resin [A]:

While the aforementioned rubber-reinforced vinyl resin [A] is a polymer component containing a diene rubber polymer [a1] and an ethylene-α-olefin rubber polymer [a2], their contained mode is not particularly restricted.

The rubber-reinforced vinyl resin [A] usually contains a graft copolymer in which a (co)polymer of a vinyl monomer has been grafted to a rubber polymer and a (co)polymer of a vinyl monomer not having grafted to a rubber polymer. It is noted that the graft copolymer may contain a rubber polymer to which no (co)polymer of a vinyl monomer has been grafted.

Therefore, examples of the contained mode of the diene rubber polymer [a1] and the ethylene-α-olefin rubber polymer [a2] are provided below:

(1) A case in which both the diene rubber polymer [a1] and the ethylene-α-olefin rubber polymer [a2] are contained in the form of graft copolymers.

(2) A case in which one of the diene rubber polymer [a1] and the ethylene-α-olefin rubber polymer [a2] is contained in the form of a graft copolymer.

(3) A case in which both the diene rubber polymer [a1] and the ethylene-α-olefin rubber polymer [a2] are contained in the form of ungrafted rubber polymers.

Among these, (1) is preferred.

Examples of the rubber-reinforced vinyl resin [A] of the above-mentioned mode (1) are provided below:

[i] A mixture composed of a rubber-reinforced vinyl resin [A1] obtained by polymerizing a vinyl monomer [b1] in the presence of the diene rubber polymer [a1] and a rubber-reinforced vinyl resin [A2] obtained by polymerizing a vinyl monomer [b2] in the presence of the ethylene-α-olefin rubber polymer [a2].

[ii] A mixture composed of the above-mentioned mixture [i] and a (co)polymer of a vinyl monomer [b3] (henceforth referred to also as "(co)polymer [C]").

[iii] A rubber-reinforced vinyl resin [A3] obtained by polymerizing a vinyl monomer [b1] and/or [b2] in the presence of the diene rubber polymer [a1] and the ethylene-α-olefin rubber polymer [a2].

[iv] A mixture composed of the rubber-reinforced vinyl resin [A3] and the (co)polymer [C].

Among these, [i] and [ii] are preferred in terms of productivity, and [ii] is particularly preferred.

The rubber-reinforced vinyl resin [A] may be a combination of two or more of the above-listed [i], [ii], [iii] and [iv].

Next, the methods for producing of the rubber-reinforced vinyl resins [A1], [A2] and [A3] will be described.

Examples of the polymerization method include conventional polymerization methods such as emulsion polymerization, solution polymerization, suspension polymerization and bulk polymerization. In any of these methods, it is permissible to feed a vinyl monomer at one time and make it react in the presence of a rubber polymer, and it is also permissible to add a vinyl monomer dividedly or continuously and make it react. Regarding the rubber polymer, the whole amount or a part of it may be added during the polymerization with the vinyl monomer and made to react.

The amount of the rubber polymer used is usually 5 to 80% by mass, and preferably 10 to 70% by mass, provided that the total of the rubber polymer and the vinyl monomer is taken as 100% by mass.

The method for producing of the above-mentioned rubber-reinforced vinyl resin [A1] is preferably emulsion polymerization, solution polymerization, or suspension polymerization, and emulsion polymerization is more preferred. The method for producing the rubber-reinforced vinyl resin [A2] is preferably emulsion polymerization, solution polymerization, or bulk polymerization, and solution polymerization is more preferred. The method for producing the rubber-reinforced vinyl resin [A3] is preferably emulsion polymerization or solution polymerization.

When producing the rubber-reinforced vinyl resins [A1], [A2] and [A3] by emulsion polymerization, a polymerization initiator, a chain transfer agent, an emulsifier, water, and so on are usually used. When the rubber polymer is not in a latex form but in a solid form, it can be used after being converted into a latex form by reemulsification.

Examples of the polymerization initiator include redox polymerization initiators composed of organic peroxides such as cumene hydroperoxide, diisopropylbenzene hydroperoxide and paramenthane hydroperoxide, and reducing agents represented by saccharated pyrophosphoric acid formulation and sulfoxilate formulation; persulfates, such as potassium persulfate; peroxides such as benzoyl peroxide (BPO), lauroyl peroxide, tert-butyl peroxylaurate and tert-butyl peroxymonocarbonate; and azo polymerization initiators such as 2,2'-azobis(isobutyronitrile). These may be used singly or in combination of two or more. The amount of the polymerization initiator to be used is usually 0.05 to 5% by mass, and preferably 0.1 to 1% by mass based on the total amount of the vinyl monomer [b1] or [b2].

The polymerization initiator is usually added to a reaction system at one time or continuously.

Examples of the chain transfer agent include mercaptans such as octylmercaptan, n-dodecylmercaptan, tert-dodecylmercaptan, n-hexylmercaptan, n-hexadecylmercaptan, n-tetradecylmercaptan and tert-tetradecylmercaptan; terpinolenes, a dimer of α-methylstyrene, tetraethylthiuram sulfide, acrolein, methacrolein, allyl alcohol and 2-ethylhexyl thioglycol. These may be used singly or in combination of two or more. The amount of the chain transfer agent to be used is usually 0.05 to 2% by mass based on the total amount of the vinyl monomer [b1] or [b2].

The emulsifier includes anionic surfactants and nonionic surfactants. Examples of the anionic surfactants include sulfate of higher alcohols; salts of alkylbenzene sulfonic acids such as sodium dodecylbenzenesulfonate; salts of aliphatic sulfonic acids such as sodium laurylsulfate; salts of rosin acids, and salts of phosphoric acid. Examples of the nonionic surfactants include alkyl ester type compounds of polyethylene glycol and alkyl ether type compounds of polyethylene glycol. These may be used singly or in combination of two or more. The amount of the emulsifier to be used is usually 0.3 to 5% by mass based on the whole amount of the vinyl monomer [b1] or [b2].

Emulsion polymerization can be carried out under conventional conditions according to the types and the amounts of the vinyl monomer [b1] or [b2], a polymerization initiator, and so on to be used. The latex obtained by the emulsion polymerization is usually coagulated using a coagulant, the polymer component is formed into a powdery form, which is then purified by washing with water and drying. As the coagulant, inorganic salts such as calcium chloride, magnesium sulfate, magnesium chloride and sodium chloride; inorganic acids such as sulfuric acid and hydrochloric acid; and organic acids such as acetic acid, lactic acid and citric acid, and so on are used. These may be used singly or in combination of two or more. According to the performance required, it is also permissible to do washing after performing neutralization treatment by the addition of an alkali component or an acid component after the coagulation.

When producing the rubber-reinforced vinyl resins [A1], [A2] and [A3] by solution polymerization, a solvent, a polymerization initiator, a chain transfer agent, and so on are usually used.

As the solvent, inert polymerization solvents to be used for conventional radical polymerization can be used; for example, aromatic hydrocarbons such as ethylbenzene and toluene; ketones such as methyl ethyl ketone and acetone; halogenated hydrocarbons such as dichloromethylene and carbon tetrachloride; acetonitrile, dimethylformamide, and N-methylpyrrolidone can be used. These may be used singly or in combination of two or more.

Examples of the polymerization initiator include organic peroxides such as ketone peroxides, dialkyl peroxides, diacyl peroxides, peroxyesters and hydroperoxides. These may be used singly or in combination of two or more.

Examples of the chain transfer agent include mercaptans, terpinolenes and a dimer of α-methylstyrene. These may be used singly or in combination of two or more.

Solution polymerization can be carried out under conventional conditions according to the types and the amounts of the vinyl monomer [b1] or [b2], a polymerization initiator, and so on to be used. The polymerization temperature is usually within the range of 80 to 140° C. The production can also be performed without using any polymerization initiator in the solution polymerization.

Also in the cases of bulk polymerization and suspension polymerization, conventional methods can be applied. As a polymerization initiator, a chain transfer agent, and the like to be used for such methods, the compounds exemplified in the description of the solution polymerization can be used.

1-5. Physical Property of Rubber-Reinforced Vinyl Resin [A]:

The graft ratios of the rubber-reinforced vinyl resins [A1], [A2] and [A3] obtained in the above-described manners are each usually 10 to 150% by mass, and preferably 20 to 120% by mass. If the graft ratio is less than 10% by mass, impact resistance may be insufficient because the interface strength between the graft copolymer and the (co)polymer of the vinyl monomer [b1] or [b2] is low. On the other hand, if the graft ratio exceeds 150% by mass, since a layer of the (co)polymer of the vinyl monomer [b1] or [b2] on the surface of the rubber polymer becomes thick and a layer of the (co)polymer grafted inside the rubber polymer develops, rubber elasticity decreases and, as a result, impact resistance may deteriorate.

The aforementioned graft ratio can be calculated by the following formula.

$$\text{Graft ratio (\% by mass)} = \{(S-T)/T\} \times 100$$

In the above formula, S is a mass (g) of an insoluble fraction obtained by charging 1 gram of a rubber-reinforced vinyl resin into 20 ml of acetone (when the rubber polymer is acrylic rubber, acetonitrile is used instead), then shaking the mixture for 2 hours with a shaker under a temperature condition of 25° C., and then centrifuging the mixture for 60 minutes with a centrifugal separator (rotation speed; 23,000 rpm) under a temperature condition of 5° C., thereby separating the insoluble fraction and the soluble fraction, and T is a mass (g) of the rubber polymer contained in 1 g of the rubber-reinforced vinyl resin. The mass of the rubber polymer can be determined by a method of calculating it from a polymerization formulation and a polymerization conversion ratio, a method of determining it from an infrared absorption spectrum (IR), and so on.

The intrinsic viscosity [η] (measured in methyl ethyl ketone at 30° C.) of the acetone-soluble fraction of each of the rubber-reinforced vinyl resins [A1], [A2] and [A3] is usually 0.1 to 1.5 dl/g, and preferably 0.2 to 1.0 dl/g. When the intrinsic viscosity [η] is within the above range, a physical property balance between moldability and impact resistance is excellent.

The measurement of the intrinsic viscosity [η] was performed by the following method. First, the acetone-soluble fraction of each of the rubber-reinforced vinyl resins [A1], [A2] and [A3] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

As described above, the rubber-reinforced vinyl resin [A] according to the present invention may be either one using a mixture of rubber-reinforced vinyl resins [A1] and [A2] prepared separately or one using a rubber-reinforced vinyl resin [A3] obtained by polymerizing a vinyl monomer [b1] and/or [b2] in the presence of a diene rubber polymer [a1] and an ethylene-α-olefin rubber polymer [a2]. Therefore, in the case of using two or more rubber-reinforced vinyl resins like the former, although resins obtained by separate production processes may be used in admixture, it is also possible to obtain by another method, for example, by producing latices respectively containing resins by emulsion polymerization, and then mixing the latices, followed by coagulation.

1-6. Method for Producing a (Co)Polymer [C]:

The (co)polymer [C] can be produced by polymerizing a vinyl monomer [b3] in the presence of a polymerization initiator and the like by a conventional method such as solution polymerization, bulk polymerization, emulsion polymerization and suspension polymerization. Such polymerization may be either catalytic polymerization using a polymerization initiator or thermal polymerization using no polymerization initiator.

1-7. Physical Properties of a (Co)Polymer [C]:

The intrinsic viscosity [η] (measured at 30° C. in methyl ethyl ketone) of the polymer [C] is usually 0.1 to 1.5 dl/g, and preferably 0.2 to 1.0 dl/g. When the intrinsic viscosity [η] is within the above range, a physical property balance between moldability and impact resistance is excellent.

The measurement of the intrinsic viscosity [η] was performed by the following method. First, the (co)polymer [C] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

2. Silicone Oil [B] (Henceforth Referred to Also as "Component [B]"):

The silicone oil as the component [B] to be used in the present invention is not particularly restricted except for a kinematic viscosity at 25° C., and well-known silicone oils can be used as far as they have a polyorganosiloxane structure. The silicone oil [B] may be either an unmodified silicone oil such as dimethyl silicone oil, methylphenyl silicone oil and methyl hydrogen silicone oil, or a modified silicone oil in which various types of organic group has been introduced to a part of a side chain in a polyorganosiloxane structure and/or one terminal portion of a polyorganosiloxane structure, or both terminal portions of a polyorganosiloxane structure. As the modified silicone oil, alkyl-modified silicone oil, methylphenyl-modified silicone oil, alkyl-aralkyl-modified silicone oil, amino-modified silicone oil, polyether-modified silicone oil, fluorine-modified silicone oil, higher alkoxy-modified silicone oil, higher fatty acid-modified silicone oil, methylstyryl-modified silicone oil, methyl chlorinated phenyl silicone oil, methyl hydrogen silicone oil, epoxy-modified silicone oil, carboxyl-modified silicone oil, acrylic-modified silicone oil, methacrylic-modified silicone oil, mercapto-modified silicone oil, phenol-modified silicone oil, carbinol-modified silicone oil, and the like can be used.

Among the above-listed modified silicone oils, at least one modified silicone oil selected from methylphenyl silicone oil, alkyl-aralkyl-modified silicone oil and amino-modified silicone oil is particularly preferred.

When the silicone oil [B] is methylphenyl silicone oil, there can be obtained an automobile interior part characterized in that generation of squeaking noises is remarkably reduced, that an effect of reducing squeaking noises is maintained without deterioration even when being placed under high temperatures for a long time, and that it is particularly superior in impact resistance and molded appearance.

When the silicone oil [B] is an alkyl-aralkyl-modified silicone oil or an amino-modified silicone oil, there can be obtained an automobile interior part characterized in that generation of squeaking noises is remarkably reduced, that an effect of reducing squeaking noises is maintained without deterioration even when being placed under high temperatures for a long time, and that it is superior in impact resistance and molded appearance.

The methylphenyl silicone oil to be used in the present invention is a non-reactive straight silicone oil in which a part of a side chain of a polysiloxane is a phenyl group.

The alkyl-aralkyl-modified silicone oil to be used in the present invention is a nonreactive modified silicone oil in which an alkyl group and an aralkyl group have been introduced into a part of a side chain of a silicone oil.

The amino-modified silicone oil to be used in the present invention is one in which an amino group has been introduced into a part of a side chain of a polysiloxane, and the amino modification may be either monoamine modification or diamine modification.

Such silicone oils [B] may be used singly or in combination of two or more.

The kinematic viscosity at 25° C. of the silicone oil [B] to be used in the present invention is 10 to 100,000 cSt, preferably 25 to 75,000 cSt, more preferably 50 to 50,000 cSt, even more preferably 250 to 25,000 cSt, and particularly preferably 500 to 15,000 cSt. When the silicone oil is methylphenyl silicone oil, it is particularly preferably 1,000 to 10,000 cSt. If the kinematic viscosity at 25° C. of the silicone oil [B] is less than 10 cSt, the effect of reducing squeaking noises is poor, whereas if the kinematic viscosity exceeds 100,000 cSt, the dispersibility of the silicone oil [B] in the rubber-reinforced vinyl resin [A] becomes poor, so that impact resistance and an effect of reducing squeaking noises fail to be provided stably and extrusion processability at the time of melt-kneading also deteriorates.

The kinematic viscosity of a silicone oil was measured with a Ubbelohde viscometer in accordance with ASTM D445-46T (JIS 8803 is also permitted).

3. Thermoplastic Resin Composition [D]:

The thermoplastic resin composition [D] in the present invention is obtained by mixing the rubber-reinforced vinyl resin [A], the silicone oil [B] and, if desired, the (co)polymer [C] in a prescribed incorporating proportion, and melt-kneading them.

The incorporation amount of the silicone oil [B] based on 100 parts by mass of the rubber-reinforced vinyl resin [A] is 0.1 to 8 parts by mass, preferably 0.2 to 6 parts by mass, more preferably 0.5 to 5 parts by mass, and particularly preferably 2.5 to 3.5 parts by mass. If the incorporation amount of the component [B] is less than 0.1 part by mass, an effect of reducing squeaking noises is not obtained. On the other hand, if the incorporation amount of the component [B] exceeds 8 parts by mass, the appearance or the impact resistance of a molded article deteriorates or melt-kneading becomes difficult.

The total amount of the diene rubber polymer [a1] and the ethylene-α-olefin rubber polymer [a2] in the component [A] is 5 to 30% by mass, preferably 5 to 25% by mass, more preferably 8 to 20% by mass, and particularly preferably 10 to 18% by mass, provided that the whole portion of the rubber-reinforced vinyl resin [A] is taken as 100% by mass. If the total amount is less than 5% by mass, impact resistance is poor, whereas if the total amount exceeds 60% by mass, heat resistance deteriorates.

The mass ratio of the diene rubber polymer [a1] to the ethylene-α-olefin rubber polymer [a2] in the component [A], [a1]:[a2], is 10 to 85:90 to 15, preferably 20 to 80:80 to 20, and more preferably 25 to 75:75 to 25. By adjusting the mass ratio of the rubber polymers into this range, the effect of reducing squeaking noises, the impact resistance and the heat resistance become superior.

The thermoplastic resin composition [D] of the present invention composed of the component [A], the component [B] and, if necessary, the component [C] can contain, if desired, various additives such as a filler, a nucleating agent, a lubricant, a heat stabilizer, an antioxidant, a UV absorber, a flame retardant, an antiaging agent, a plasticizer, an antibacterial agent, and a colorant as far as the object of the present invention is not impaired.

Moreover, the thermoplastic resin composition [D] of the present invention can contain, if necessary, other resins, for example, polyethylene, polypropylene, polybutylene terephthalate, polyethylene terephthalate, polycarbonate, polyphenylene sulfide, and polyamide as far as the object of the present invention is not impaired.

The thermoplastic resin composition [D] of the present invention can be produced by mixing respective components in a prescribed incorporation ratio by using a Tumbler mixer or a Henschel mixer, and then melt-kneading them under appropriate conditions by using a mixing machine such as a single screw extruder, a twin screw extruder, a Banbury mixer, a kneader, a roll and a feeder ruder. A preferred kneading machine is a twin screw extruder. In kneading respective components, it is permissible to knead the respective components at one time and it is also permissible to incorporate and knead them dividedly in multiple stages. Moreover, it is also permissible to perform pelletization by using an extruder after kneading with a Banbury mixer, a kneader, or the like. Among fillers, one in a fibrous form prefers a method of feeding it at the middle of an extruder by the use of a side feeder in order to prevent cutting during kneading. The melt kneading temperature is usually 200 to 300° C., and preferably 220 to 280° C.

4. Automobile Interior Part:

The automobile interior part of the present invention is obtained by molding the above-described thermoplastic resin composition [D]. There are no limitations in the method of producing the automobile interior part of the present invention from the thermoplastic resin composition [D], and it can be produced by a conventional method such as injection molding, injection compression molding, blow molding, gas assisted injection molding, press molding, calender molding, T-die extrusion molding, profile extrusion molding and film molding.

There are no particular limitations with respect to the thermoplastic resin [Y] that constitutes other members with which the automobile interior part of the present invention comes into contact, and examples thereof include a thermoplastic resin containing the rubber-reinforced vinyl resin [A] of the present invention, a thermosetting resin, a rubber, an organic material, an inorganic material and a metallic material, which can be produced by the same molding method as that used for the aforementioned thermoplastic resin composition [D].

Examples of the thermoplastic resin [Y] include polyvinyl chloride, polyethylene, polypropylene, AS resin, ABS resin, AES resin, ASA resin, polymethyl methacrylate, polystyrene, high impact polystyrene, EVA, polyamide (PA), polyethylene terephthalate, polybutylene terephthalate, polycarbonate (PC), polylactic acid, PC/ABS, PC/AES, PA/ABS and PA/AES. These can be used singly or in combination of two or more.

Examples of the thermosetting resin include phenol resin, epoxy resin, urea resin, melamine resin and unsaturated polyester resin. These can be used singly or in combination of two or more.

Examples of the rubber include various synthetic rubbers such as chloroprene rubber, polybutadiene rubber, ethylene-propylene rubber, SEBS, SBS and SIS, and natural rubbers. These can be used singly or in combination of two or more.

Examples of the organic material include an insulation board, an MDF (medium density fiberboard), a hard board, a particle board, a lumber core, an LVL (laminated veneer lumber), an OSB (oriented stack board), a PSL (Para-Lum), a WB (wafer board), a hard fiber board, a soft fiber board, a lumber core plywood, a board core plywood, a special core plywood, a veneer core plywood, a stack sheet/board of paper impregnated with a tap resin, a board produced by mixing an adhesive with fine chips/strips prepared by breaking (used) paper, and then compressing the mixture under heating, and various types of wood. These can be used singly or in combination of two or more.

Examples of the inorganic material include calcium silicate board, flexible board, homocement board, gypsum board, sheathing gypsum board, reinforced gypsum board, gypsum lath board, decorated gypsum board, composite gypsum board, various ceramics and glass. These can be used singly or in combination of two or more.

Moreover, examples of the metallic material include iron, aluminum, copper and various alloys. These can be used singly or in combination of two or more.

As the thermoplastic resin [Y], one that is selected from the groups Y1 to Y4, which are superior in heat resistance, is particularly preferred:

Y1: a polycarbonate/rubber-reinforced styrene-based resin alloy having an HDT of 85° C. or higher, Y2: a styrene-based resin having an HDT of 85° C. or higher (excluding the above Y1), Y3: a polyolefin-based resin having an HDT of 85° C. or higher, and Y4: a methacrylic-based resin having an HDT of 85° C. or higher.

These are used singly or, if necessary, in combination of two or more.

In the present invention, a HDT (heat distortion temperature) is a value (the unit is ° C.) measured under a condition of a load 1.80 MPa in accordance with ISO75.

4-1. Polycarbonate/Rubber-Reinforced Styrene-Based Resin Alloy [Y1] having a HDT of 85° C. or Higher (Henceforth Referred to also as "Component [Y1]"):

In the present invention, the polycarbonate/rubber-reinforced styrene resin [Y1] is not particularly restricted as far as its HDT is 85° C. or higher, and it is a material obtained by melt-mixing the polycarbonate (Y1a) and the rubber-reinforced styrene resin (Y1b) described below usually in a ratio of from 10/90 to 90/10 parts by mass, preferably from 30/70 to 70/30 parts by mass, and more preferably from 40/60 to 60/40 parts by mass. When the incorporation amount of the component [Y1a] is less than 10 parts by mass, the heat resistance may become insufficient, whereas when the incorporation amount of the component [Y1a] exceeds 90 parts by mass, the moldability and the impact resistance may become insufficient.

The polycarbonate resin [Y1a] is not particularly restricted, and it may be either an aromatic polycarbonate or an aliphatic polycarbonate. Moreover, an aromatic polycarbonate and an aliphatic polycarbonate may be used in combination. It is noted that the polycarbonate resin may be one whose terminal has been modified with an R—CO-group and an R'—O—CO-group (R and R' each represent an organic group).

In the present invention is preferred an aromatic polycarbonate, examples of which include one obtained by a reaction of a dihydroxyaryl compound with carbonyl chloride (phosgene method), and one obtained by transesterification of a dihydroxyaryl compound with diphenyl carbonate (transesterification method).

Examples of the dihydroxyaryl compound that is used as a raw material of the aromatic polycarbonate include bis(4-hydroxyphenyl)methane, 1,1'-bis(4-hydroxyphenyl)ethane, 2,2'-bis(4-hydroxyphenyl)propane (henceforth referred to also as "bisphenol A"), 2,2'-bis(4-hydroxyphenyl)butane, 2,2'-bis(4-hydroxyphenyl)octane, 2,2'-bis(4-hydroxyphenyl)phenylmethane, 2,2'-bis(4-hydroxy-3-methylphenyl)propane, 2,2'-bis(4-hydroxy-3-tert-butylphenyl)propane, 2,2'-bis(4-hydroxy-3-bromophenyl)propane, 2,2'-bis(4-hydroxy-3,5-dichlorophenyl)propane, 1,1'-bis(4-hydroxyphenyl)cyclopentane, 1,1'-bis(4-hydroxyphenyl)cyclohexane, 4,4'-dihydroxydiphenyl ether, 4,4'-dihydroxy-3,3'-dimethyldiphenyl ether, 4,4'-dihydroxyphenyl sulfide, 4,4'-dihydroxyphenyl sulfide, 4,4'-dihydroxy-3,3'-dimethylphenyl sulfide, 4,4'-dihydroxydiphenyl sulfoxide, 4,4'-dihydroxyphenyl sulfoxide, 4,4'-dihydroxy-3,3'-dimethyldiphenyl sulfoxide, 4,4'-dihydroxydiphenyl sulfone, 4,4'-dihydroxy-3,3'-dimethyldiphenyl sulfone, hydroquinone and resorcinol. Among these, bisphenol A is preferred. These may be used singly or in combination of two or more.

A typical aromatic polycarbonate is one obtained by a reaction of bisphenol A with carbonyl chloride.

The aromatic polycarbonate and the aliphatic polycarbonate each can be used singly or in combination of two or more.

The viscosity average molecular weight of the polycarbonate resin [Y1a] is preferably 8,000 to 50,000, more preferably 12,000 to 30,000, and even more preferably 15,000 to 26,000. The viscosity average molecular weight can be measured by a conventional method. If the viscosity average molecular weight is excessively small, the impact resistance of a molded article tends to be poor, whereas if the viscosity average molecular weight is excessively large, the moldability of a composition tends to be poor. Moreover, two or more polycarbonate resins differing in viscosity average molecular weight within the above-mentioned range can also be used.

The specific gravity at 20° C. of the polycarbonate resin is usually 1.18 to 1.22 g/cm$^3$.

The rubber-reinforced styrene-based resin [Y1b] is a material obtained by polymerizing a vinyl monomer essentially containing an aromatic vinyl compound in the presence of a rubber polymer; for example, a rubber-reinforced styrene-based resin in a styrene-based resin [Y2] described below can be used. Among such rubber-reinforced resins, use of an ABS resin using a polybutadiene as the rubber polymer is preferred from the viewpoint of impact resistance, and use of an AES resin using an ethylene-propylene-(nonconjugated diene) copolymer is preferred from the viewpoint of weatherability.

The content of the rubber polymer in the polycarbonate/rubber-reinforced styrene-based resin [Y1] is usually 5 to 30% by mass, preferably 5 to 25% by mass, and more preferably 8 to 18% by mass, provided that the [Y1] component is taken as 100% by mass. When the incorporation amount of the rubber polymer is less than 5% by mass, the impact resistance of a resulting molded article may become insufficient, whereas when the incorporation amount of the rubber polymer exceeds 30% by mass, the heat resistance may become insufficient.

The mixing order and the states of the polycarbonate [Y1a] and the rubber-reinforced styrene-based resin [Y1b] are not particularly restricted, and simultaneous mixing at one time in a form of powder, pellet, or the like and a method of preliminarily mixing specific components and then mixing remaining components are exemplified. At the time of such melt-mixing, a Banbury mixer, a roll, an extruder, and so on can be used.

To the polycarbonate/rubber-reinforced styrene-based resin [Y1] can be added, as far as the effect of the present invention is not impaired, other thermoplastic resins, as well as conventional additives such as an antioxidant, a UV absorber, a light stabilizer, an antistatic agent, a lubricant, a dye, a pigment, a plasticizer, a flame retardant, a release agent, glass fiber, metal fiber, carbon fiber, and metal flakes, a reinforcing material and a filler.

4-2. Styrene-Based Resin having an HDT of 85° C. or Higher [Y2] (Except for the Above [Y1]) (Henceforth Referred to also as "Component [Y2]"):

The styrene-based resin [Y2], which is not particularly restricted as far as its HDT is 85° C. or higher, is a polymer or a copolymer obtained by polymerizing an aromatic vinyl compound or polymerizing an aromatic vinyl compound with, for example, a vinyl monomer (a2') composed of at least one member selected from among monomers such as a vinyl cyanide compound, a (meth)acrylic acid alkyl ester, and a maleimide compound in the presence or absence of a rubber polymer (aft A copolymer (rubber-reinforced styrene-based resin) prepared by polymerizing (a2') in the presence of (a1'), a (co)polymer prepared by polymerizing (a2') in the absence of (a1'), and a mixture thereof are contained in the [Y2] component of the present invention. The proportion of the repeating units derived from the aromatic vinyl compound in the component (a2') is usually 95 to 40% by mass, and preferably 90 to 60% by mass.

Examples of the rubber polymer (a1') include polybutadiene, a butadiene-styrene copolymer, a butadiene-acrylonitrile copolymer, a butadiene-(meth)acrylic acid ester copolymer, a styrene-butadiene-styrene block copolymer, a styrene-butadiene block copolymer, a styrene-isoprene-styrene block copolymer, a styrene-isoprene block copolymer, and products resulting from hydrogenation of the diene polymer portions of the foregoing polymers (products whose hydrogenation ratio of their diene portions are 30% or more), an ethylene-propylene-(nonconjugated diene) copolymer, an ethylene-butene-(nonconjugated diene) copolymer, urethane rubber, acrylic rubber, silicone rubber, and a silicone-acrylic IPN rubber. These are used singly or in combination of two or more.

Among these, the polybutadiene, the butadiene-styrene copolymer, the styrene-butadiene-styrene block copolymer, a product resulting from hydrogenation of the butadiene portions of the foregoing block copolymer (a product whose hydrogenation ratio of its diene portions is 30% or more), the ethylene-propylene-(nonconjugated diene) copolymer, the acrylic rubber and the silicone rubber are preferred.

As the styrene-based resin [Y2] of the present invention, a rubber-reinforced styrene-based resin containing a rubber polymer is preferred in terms of impact resistance. In this case, the amount of the rubber polymer (a1') is usually 5 to 80% by mass, preferably 5 to 50% by mass, more preferably 8 to 40% by mass, and particularly preferably 10 to 35% by mass.

Among such styrene-based resins [Y2], use of an ABS resin using a polybutadiene as the rubber polymer is preferred from the viewpoint of impact resistance, and use of an AES resin using an ethylene-propylene-(nonconjugated diene) copolymer is preferred from the viewpoint of weatherability.

As the vinyl monomer (a2') to be used for the styrene-based resin [Y2] of the present invention, there can be used vinyl monomers the same as the vinyl monomers (b1) to (b3) used in the production of the above-described rubber-reinforced vinyl resin [A] and the above-described (co)polymer [B].

Preferred combinations of the vinyl monomer (a2') include styrene/acrylonitrile, α-methylstyrene/acrylonitrile, styrene/methyl methacrylate, styrene/methyl methacrylate/acrylonitrile, styrene/phenylmaleimide, styrene/maleic anhydride, styrene/acrylonitrile/2-hydroxyethyl methacrylate, styrene/acrylonitrile/methacrylic acid, and styrene/acrylonitrile/glycidyl methacrylate. In the case of using styrene and acrylonitrile as essential components, a preferred use ratio is within a range of 60 to 90/10 to 40% by mass in terms of the proportion of styrene-derived repeating units/acrylonitrile-derived repeating units.

The styrene-based resin [Y2] of the present invention can be polymerized by emulsion polymerization, block polymerization, solution polymerization or suspension polymerization, which are known polymerization methods, or a method in which those polymerization methods are combined.

Specific examples of the styrene-based resin having not been reinforced with rubber include a polystyrene, an AS resin, an MS resin, and an MAS resin. The weight average molecular weight thereof is usually 20,000 or more, preferably 30,000 or more, more preferably 50,000 or more, and it is usually 1,000,000 or less, preferably 500,000 or less, and more preferably 300,000 or less.

Specific examples of the styrene-based resin having been reinforced with rubber include a HIPS resin, an ABS resin, an AES resin, an MBS resin and an ASA resin. The styrene-based resin [Y2] in the present invention may be composed only of a styrene-based resin having not been reinforced with a rubber or only of a styrene-based resin having been reinforced with a rubber, or may be a mixture of these.

When the styrene-based resin [Y2] of the present invention contains a rubber-reinforced styrene-based resin, the average particle diameter of the rubber polymer dispersed in the resin is preferably within the range of 50 to 3000 nm from the viewpoint of impact resistance and the surface appearance of a molded article, more preferably 100 to 2000 nm, and particularly preferably 150 to 800 nm.

The graft ratio of the rubber-reinforced styrene-based resin obtained by copolymerizing a vinyl monomer in the presence of a rubber polymer is preferably 20 to 200% by mass, more preferably 30 to 150% by mass, and particularly preferably 40 to 120% by mass.

The aforementioned graft ratio can be calculated by the following formula.

$$\text{Graft ratio (\% by mass)} = \{(S-T)/T\} \times 100$$

In the above formula, S is a mass (g) of an insoluble fraction obtained by charging 1 gram of a rubber-reinforced styrene-based resin into 20 ml of acetone (when the rubber polymer is acrylic rubber, acetonitrile is used instead), then shaking the mixture for 2 hours with a shaker under a temperature condition of 25° C., and then centrifuging the mixture for 60 minutes with a centrifugal separator (rotation speed; 23,000 rpm) under a temperature condition of 5° C., thereby separating the insoluble fraction and the soluble fraction, and T is a mass (g) of the rubber polymer contained in 1 g of the rubber-reinforced styrene-based resin. The mass of the rubber polymer can be determined by a method of calculating it from a polymerization formulation and a polymerization conversion ratio, a method of determining it from an infrared absorption spectrum (IR), and so on.

The intrinsic viscosity [η] (measured in methyl ethyl ketone at 30° C.) of the acetone-soluble fraction of the styrene-based resin [Y2] is all usually 0.1 to 1.5 dl/g, and preferably 0.2 to 1.0 dl/g. If the intrinsic viscosity [η] is within the above range, a physical property balance between moldability and impact resistance is excellent.

The measurement of the intrinsic viscosity [η] was performed by the following method. First, the acetone-soluble fraction of the styrene-based resin [Y2] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

Moreover, to the styrene-based resin [Y2] can be added, as far as the effect of the present invention is not impaired, other thermoplastic resins, as well as conventional additives such as an antioxidant, a UV absorber, a light stabilizer, an antistatic agent, a lubricant, a dye, a pigment, a plasticizer, a flame retardant, a release agent, glass fiber, metal fiber, carbon fiber, and metal flakes, a reinforcing material and a filler.

4-3. Polyolefin Resin having a HDT of 85° C. or Higher [Y3] (Henceforth Referred to also as "Component [Y3]"):

In the present invention, the polyolefin resin [Y3] is not particularly restricted as far as its HDT is 85° C. or higher, and it is typically a polymer containing at least one olefin selected from among ethylene and α-olefins having 3 to 10 carbon atoms as a constitutional monomer unit. The olefin-based resin is preferably one that exhibits crystallinity at room temperature by X-ray diffraction, and it is more preferred that the crystallinity is 20% or more and the melting point is 40° C. or higher. Moreover, it is preferred that the olefin-based resin has sufficient strength for use at a normal temperature and has sufficient moldability for injection molding and the like.

Examples of an olefin that is a constitutional monomer unit of the component [Y3] include ethylene, propylene, 1-butene, 1-pentene, 1-hexene, 3-methyl-1-butene, 4-methyl-1-pentene, and 3-methyl-1-hexene, and preferred are ethylene, propylene, 1-butene, 3-methyl-1-butene and 4-methyl-1-pentene. Besides, nonconjugated diene such as 4-methyl-1,4-hexadiene, 5-methyl-1,4-hexadiene, 7-methyl-1,6-octadien, and 1,9-decadiene, and so on can be used as other monomer components.

As the component [Y3], an ionomer, an ethylene-vinyl acetate copolymer, an ethylene-vinyl alcohol copolymer, a cyclic olefin copolymer, chlorinated polyethylene, brominated polyethylene, and so on can also be used.

The component [Y3] to be used in the present invention may be either a homopolymer or a copolymer, and the copolymer may be either a random copolymer or a block copolymer, and among these, a propylene homopolymer is preferred.

For example, the polypropylene resin as the component [Y3] preferably has a melt flow rates (MFR), measured under conditions of 230° C. and 2.16 kg, of 0.01 to 500 g/10 minutes, and more preferably 0.05 to 100 g/10 minutes.

Moreover, to the polyolefin resin [Y3] can be added, as far as the effect of the present invention is not impaired, other thermoplastic resins, as well as conventional additives such as an antioxidant, a UV absorber, a light stabilizer, an antistatic agent, a lubricant, a dye a pigment, a plasticizer, a flame retardant, a release agent, glass fiber, metal fiber, carbon fiber, and metal flakes, a reinforcing material and a filler.

To the polyolefin resin [Y3] to be used in the present invention may, if necessary, be incorporated an inorganic filler. The incorporation of the inorganic filler may increase the hardness and rigidity of the polyolefin resin, improving the effect of reducing squeaking noises. Examples of the inorganic filler to be used in the present invention include inorganic compound powders such as talc, calcium carbonate, mica, silica and titania, metal, ceramics, glass beads, and fibrous fillers such as glass fiber.

Examples of the fibrous fillers include glass fiber, organic fibers such as carbon fiber and aramid fiber, inorganic fiber such as ceramic whisker and metal fiber. In the present invention, it is preferred, from the viewpoint of improving hardness and rigidity at high temperatures, to use glass fiber.

Examples of the composition of the glass to be used in the glass fiber include silicate glass, borosilicate glass and phosphate glass. Examples of the type of glass include E glass, C glass, A glass, S glass, M glass, AR glass and L glass, among these, E glass and C glass are preferred. An appropriate seizing agent may be used for the glass fiber to be used in the present invention. Examples of such a seizing agent include a finishing agent, a film forming agent, a lubricant, a surfactant and an antistatic agent. Examples of the finishing agent include coupling agents such as an amine-type coupling agent, a silane-type coupling agent and an epoxy-type coupling agent. The glass fiber to be used in the present invention may be either glass fiber of long fiber type using a roving or a chopped strand.

The average length of the glass fiber before its mixing with a polyolefin resin is preferably 1 to 10 mm, and more preferably 2 to 6 mm, and its average diameter is preferably 5 to 100 μm, and more preferably 8 to 20 μm.

Moreover, the average residual fiber length of glass fiber dispersed in a molded article produced by molding a polyolefin resin is preferably 0.15 to 1 mm, more preferably 0.2 to 0.8 mm, and even more preferably 0.25 to 0.7 mm. That the average residual fiber length is within the above-mentioned range is more preferred from the viewpoint of hardness and rigidity at high temperatures.

The average residual fiber length is measured by cutting out a part of a molded article. Specifically, the cut-out molded article is heated to 800° C., thereby decomposing a resin component, and then the fiber length of remaining glass fiber is measured by image analysis.

The incorporation amount of the inorganic filler based on 100 parts by mass of the polyolefin resin is usually 1 to 50 parts by mass, and preferably 5 to 45 parts by mass.

[Y4]=Methacrylic Resin having an HDT of 85° C. or higher (Henceforth Referred to also as "Component [Y4]"):

In the present invention, the methacrylic resin [Y4] is not particularly restricted as far as its HDT is 85° C. or higher. The methacrylic resin is a resin prepared by using a methacrylic acid alkyl ester that has an alkyl group having 1 to 4 carbon atoms as a main raw material, for example, a resin that has a content of compound units derived from the methacrylic acid alkyl ester in the methacrylic resin of usually 50 to 100% by mass, preferably 60 to 100% by mass, more preferably 70 to 100% by mass, and particularly preferably 80 to 100% by mass.

The methacrylic resin [Y4] may be either a homopolymer of a methacrylic acid alkyl ester that has an alkyl group having 1 to 4 carbon atoms or a copolymer of such a methacrylic acid alkyl ester and other monomers. Examples of the methacrylic acid alkyl ester that has an alkyl group having 1 to 4 carbon atoms include methyl methacrylate, ethyl methacrylate and butyl methacrylate, and these may be used singly or in combination of two or more. As the methacrylic acid alkyl ester, methyl methacrylate is used preferably.

Examples of the monomer copolymerizable with a methacrylic acid alkyl ester include acrylic acid alkyl esters; aromatic vinyl compounds, e.g., styrene, alkyl-substituted styrenes such as o-methylstyrene, p-methylstyrene, 2,4-dimethylstyrene, ethylstyrene and p-tert-butylstyrene, and α-alkyl-substituted styrenes such as α-methylstyrene and α-methyl-p-methylstyrene; vinyl cyanides such as acrylonitrile and methacrylonitrile; maleimides such as N-phenylmaleimide and N-cyclohexylmaleimide; unsaturated carboxylic acid anhydrides such as maleic anhydride; and unsaturated acids such as acrylic acid, methacrylic acid and maleic acid. Such monomers copolymerizable with methacrylic acid alkyl esters can be used singly or in combination of two or more.

Among such monomers copolymerizable with methyl methacrylate, acrylic acid alkyl esters are particularly preferred in that they are superior in resistance to thermal decomposition, and a methacrylic resin obtained by copolymerizing an acrylic acid alkyl ester is preferred in that it is high in flowability at the time of molding. The amount of the acrylic acid alkyl ester to be used when copolymerizing the acrylic acid alkyl ester with methyl methacrylate is preferably 0.1% by mass or more from the viewpoint of resistance to thermal decomposition, and it is preferably 15% by mass or less from the viewpoint of heat resistance. The amount of the acrylic acid alkyl ester to be used in this case is more preferably not less than 0.2% by mass and not more than 14% by mass, and particularly preferably not less than 1% by mass and not more than 12% by mass. Among such acrylic acid alkyl esters, methyl acrylate and ethyl acrylate are most preferred because a remarkable improvement effect will be exhibited even when they are copolymerized in a small amount with methyl methacrylate. The monomers copolymerizable with methyl methacrylate can be used singly or in combination of two or more.

The weight average molecular weight of the methacrylic resin is usually 30,000 to 300,000, and preferably 50,000 to 200,000. From the viewpoint of the strength of a molded article, the weight average molecular weight is preferably 30,000 or more, and from the viewpoint of moldability and flowability, it is preferably 300,000 or less. In the present invention, isotactic polymethacrylic acid ester and syndiotactic polymethacrylic acid ester can be used simultaneously.

Moreover, to the methacrylic resin [Y4] can be added, as far as the effect of the present invention is not impaired, other thermoplastic resins, as well as conventional additives such as an antioxidant, a UV absorber, a light stabilizer, an antistatic agent, a lubricant, a dye, a pigment, a plasticizer, a flame retardant, a release agent, glass fiber, metal fiber, carbon fiber, and metal flakes, a reinforcing material and a filler.

The automobile interior part of the present invention is configured with a molded article of the thermoplastic resin composition [D] having been assembled with a molded article of a thermoplastic resin [Y] that constitutes other members, and it can remarkably reduce squeaking noises generated when the molded articles come into contact and rub against each other. Examples of such an automobile interior part include a door trim, a door lining, a pillar garnish, a console, a door pocket, a ventilator, a duct, an air-conditioner, a meter visor, an instrument panel upper garnish, an instrument panel lower garnish, an A/T indicator, on-off switches (a slide part, a slide plate) a grill front defroster, a grill side defroster, a lid cluster, a cover instrument lower, masks (e.g., a mask switch and a mask radio), a glove box, pockets (e.g., a pocket deck and a pocket card), a cup holder, a switch box and a steering wheel horn pad. Among these, it can be used suitably for a ventilator of a car, and it can be used particularly suitably as a plate vane of a ventilator for an air-conditioner of a car, a valve shutter, a louver, and so on. Thus, it is suitable for parts having a fitting portion with other members.

EXAMPLES

Hereinafter, the present invention will be described more specifically by way of examples. However, the present invention is not limited to the examples unless departing from the spirit of the invention. In the examples, part and % are on a mass basis, unless otherwise stated.

(1) Evaluation Methods:

The measuring methods of the evaluation items in the following Examples and Comparative Examples are represented below.

(1-1) Squeaking Noise Evaluation I (Practical Use Evaluation):

Using an injection molding machine "J-100E" (model name) manufactured by The Japan Steel Works, Ltd., ISO dumbbell specimens made of the thermoplastic resin compositions [D] shown in Table 1 and Table 2 were injection-molded, and then the specimens were left at rest in a gear oven at 80° C. for 200 hours, 400 hours and 800 hours as shown in Table 1 and Table 2. Next, five ISO dumbbell specimens made of the thermoplastic resin compositions [D] shown in Table 1 and Table 2 and five ISO dumbbell specimens made of a thermoplastic resin [Y] left at rest similarly in a gear oven at 80° C. for 200 hours, 400 hours and 800 hours were stacked one on another, and both ends thereof were twisted by hand, thereby evaluating a condition of squeaking noise generation. The evaluation was carried out five times and judgment was done on the basis of the following evaluation standard.

Evaluation of an effect of reducing squeaking noises:
○: In all of the five evaluations, there was only slight generation of squeaking noises.
Δ: The five evaluations included a case where there was remarkable generation of squeaking noises.
x: In all of the five evaluations, there was remarkable generation of squeaking noises.

(1-2) Squeaking Noise Evaluation II (Friction Velocity Dependency of Friction Coefficient):

Using an electric injection molding machine "ELJECT NEX30" (model name) manufactured by Nissei Plastic Industrial Co., Ltd., cylindrical specimens having an inner diameter of 20 mm, an outer diameter of 24.8 mm, and a height of 15 mm made of the thermoplastic resin compositions [D] and the thermoplastic resin [Y] shown in Table 1 were injection-molded under the condition specified by a molding temperature of 240° C., a mold temperature of 50° C., and an injection speed of 30 mm/s. Then, the specimens made of the thermoplastic resin compositions [D] and the thermoplastic resin [Y] were left at rest in a gear oven at 80° C. for 400 hours. Next, using a wear friction tester "EFM-III-EN" (trade name) manufactured by ORIENTEC Co., Ltd., a specimen made of the thermoplastic resin [Y] shown in Table 1 was set, as an object to contact, on the rotation side and a specimen made of the thermoplastic resin composition [D] shown in Table 1 was set on the fixed side. A frictional strength was measured under the conditions specified by a load of 3 kg and rotation speeds (friction speeds) of 50 mm/s, 100 mm/s, and 150 mm/s, and an slope of the coefficient of friction to the friction speed was determined.

(1-3) Squeaking Noise Evaluation III (Frictional Oscillation Evaluation):

Using an electric injection molding machine "ELJECT NEX30" (model name) manufactured by Nissei Plastic Industrial Co., Ltd., cylindrical specimens having an inner diameter of 20 mm, an outer diameter of 24.8 mm, and a height of 15 mm made of the thermoplastic resin compositions [D] and the thermoplastic resin [Y] shown in Table 2 were injection-molded. Then, specimens having been left at rest in a gear oven at 80° C. for 400 hours and specimens without being left at rest in a gear oven (0 hour) were prepared. Next, using a wear friction tester "EFM-III-EN" (trade name) manufactured by ORIENTEC Co., Ltd., a specimen left at rest in the gear oven at 80° C. for 400 hours and made of the thermoplastic resin [Y] shown in Table 2 was set, as an object to contact, on the rotation side and a specimen left at rest in the gear oven at 80° C. for 400 hours and made of the thermoplastic resin composition DA shown in Table 2 was set on the fixed side. A friction strength was measured while moving and stopping were repeated at an interval of three times per second under the condition specified by a load of 6 kg and a rotation speed (friction speed) of 1 mm/s. On the basis of the waveform of the measurements of friction strength, generation of frictional oscillation was evaluated. The evaluation was carried out repeatedly three times and measurement was done on the basis of the following evaluation standard.

Moreover, frictional oscillation evaluation was carried out similarly for a combination of a specimen without being left at rest in a gear oven and made of the thermoplastic resin [Y] shown in Table 2 and a specimen without being left at rest in a gear oven and made of the thermoplastic resin [D] shown in Table 2.

Evaluation of an Effect of Reducing Squeaking Noises:
(Superior) (Inferior)
0-1>0-2>0-3>1-1>1-2>1-3

0-1: There was no frictional oscillation and the frictional strength was 150 g/cm$^2$ or less.
0-2: There was no frictional oscillation and the frictional strength was more than 150 to 200 g/cm$^2$.
0-3: There was no frictional oscillation and the frictional strength was more than 200 g/cm$^2$.
1-1: Frictional oscillation was slightly recognized and the magnitude of the frictional oscillation was 25 g/cm$^2$ or less.
1-2: There was a medium degree of frictional oscillation and the magnitude of the frictional oscillation was more than 25 to 50 g/cm$^2$.
1-3: There was large frictional oscillation and the magnitude of the frictional oscillation was more than 50 g/cm$^2$.

(1-4) Molded Appearance Evaluation

Using an electric injection molding machine "ELJECT NEX30" (model name) manufactured by Nissei Plastic Industrial Co., Ltd., disc-shaped specimens having a diameter of 80 mm and a thickness of 2 mm made of the thermoplastic resin compositions [D] shown in Table 2 were injection-molded, where five specimens were produced for each thermoplastic resin composition [D]. Each specimen had a gate of ϕ 1 mm×1 mm at the center of the disc, and the molding temperature was 240° C., the mold temperature was 50° C., and the injection speed was 30 mm/s. The obtained five specimens were observed and judgment was done on the basis of following standard.

○: In all of the five specimens, there was no generation of jetting.
Δ: The five specimens included a specimen in which jetting generated, but the size thereof was 10 mm or less.
x: In the five specimens, jetting generated and the size thereof was larger than 10 mm.

(1-5) Falling Weight Impact Strength:

Using an electric injection molding machine "ELJECT NEX30" (model name) manufactured by Nissei Plastic Industrial Co., Ltd., plate-shaped specimens having a size of 80 mm×55 mm×2.4 mm made of the thermoplastic resin compositions [D] shown in Table 1 and Table 2 were injection-molded. Each specimen had a side gate of 4 mm×1 mm at the center of one 55 mm side, and the resin temperature at the time of molding was 240° C., the mold temperature was 50° C., and the injection speed was 30 mm/s. Next, using a Shimadzu Hydroshot, high-speed puncture impact testing machine "HITS-P10" (model name) manufactured by Shimadzu Corporation, a breaking energy (J) was measured by punching the above-described specimen under the conditions given below:
Measurement temperature: 23° C.
Punching speed: 6.7 mm/s
Striker tip of a jig for punching test: ϕ 412.7 mm
Dice diameter of a table for receiving a specimen: 43 mm (2-1) Component [A]

A1: ABS-1

A polymerization vessel equipped with a stirrer was charged with 280 parts of water, 60 parts (in terms of solid) of polybutadiene latex having a weight average particle diameter of 0.26 µm and a gel fraction of 90%, 0.3 part of sodium formaldehyde sulfoxylate, 0.0025 part of ferrous sulfate, and 0.01 part of disodium ethylenediaminetetraacetate, followed by deoxygenation. After heating to 60° C. under stirring under a nitrogen flow, a monomer mixture composed of 10 parts of acrylonitrile, 30 parts of styrene, 0.2 part of tert-dodecyl mercaptan, and 0.3 part of cumene hydroperoxide was dropped at 60° C. continuously over 5 hours. After completion of the dropping, the polymerization temperature was raised to 65° C., and the polymerization was completed after continuing stirring for 1 hour, so that a latex of a graft copolymer was obtained. The polymerization conversion was 98%. Then, the resulting latex was coagulated by adding 0.2 part of 2,2'-methylene-bis(4-ethylene-6-tert-butylphenol) and calcium chloride thereto, and a resin composition in a powder form was obtained after washing, filtration, and drying steps. The graft ratio of the resulting resin composition was 40% and the intrinsic viscosity [η] of the acetone-soluble fraction was 0.38 dl/g.

A2: AES-1

A stainless steel autoclave having a volume of 20 liters equipped with a ribbon type stirrer vane, a continuous aid feeder, a thermometer, etc. was charged with 22 parts of an ethylene-α-olefin-based rubber (ethylene-propylene copolymer having an ethylene/propylene=78/22(%) and a Mooney viscosity (ML$_{1+4}$, 100° C.) of 20), 55 parts of styrene, 23 parts of acrylonitrile, 0.5 part of tert-dodecyl mercaptan, and 110 parts of toluene, then the internal temperature was raised to 75° C., and then the content in the autoclave was stirred for 1 hour to form a homogeneous solution. Then, 0.45 part of tert-butyl peroxyisopropyl monocarbonate was added and the inner temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C., and 0.2 part of octadecyl-3-(3,5-di-tert-butyl-4-hydroxyphenol) propionate was added. Then, the reaction mixture was taken out from the autoclave, an unreacted substance and a solvent were distilled off therefrom by steam distillation, and moreover volatile components were removed substantially completely by using a 40 mm ϕ extruder having a vent (cylinder temperature: 220° C., degree of vacuum: 760 mmHg), thereby forming pellets. The resulting ethylene-α-olefin rubber-reinforced vinyl resin had a graft ratio of 70% and the intrinsic viscosity [η] of its acetone-soluble fraction was 0.47 dl/g.

A2: AES-2

A stainless steel autoclave having a volume of 20 liters equipped with a ribbon type stirrer vane, a continuous aid feeder, a thermometer, etc. was charged with 30 parts of an ethylene-α-olefin-based rubber (ethylene-propylene-dicyclopentadiene copolymer having an ethylene/propylene/dicyclopentadiene=63/32/5(%) and a Mooney viscosity (ML$_{1+4}$, 100° C.) of 33), 45 parts of styrene, 25 parts of acrylonitrile, 0.5 part of tert-dodecyl mercaptan, and 140 parts of toluene, then the internal temperature was raised to 75° C., and then the content in the autoclave was stirred for 1 hour to form a homogeneous solution. Then, 0.45 part of tert-butyl peroxyisopropyl monocarbonate was added, and the internal temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C. and 0.2 part of octadecyl-3-(3,5-di-tert-butyl-4-hydroxyphenol)propionate was added. Then, the reaction mixture was taken out from the autoclave, an unreacted substance and a solvent were distilled off therefrom by steam distillation, and moreover volatile components were removed substantially completely by using a 40 mm ϕ extruder having a vent (cylinder temperature: 220° C., degree of vacuum: 760 mmHg), thereby forming pellets. The resulting ethylene-α-olefin rubber-reinforced vinyl resin had a graft ratio of 60%, and the intrinsic viscosity [η] of its acetone-soluble fraction was 0.45 dl/g.

A2: ABS-2

To a glass reaction vessel equipped with a stirrer were added 75 parts of ion exchange water, 0.8 part of potassium rosinate, 0.15 part of tert-dodecyl mercaptan, 20 parts (in terms of solid) of polybutadiene latex (weight average particle diameter: 0.26 μm, gel content: 90%), 15 parts of styrene, and 5 parts of acrylonitrile, and then the temperature was raised under stirring under a nitrogen flow. When the internal temperature had reached 45° C., a solution prepared by dissolving 0.2 part of sodium pyrophosphate, 0.01 part of ferrous sulfate heptahydrate, and 0.2 part of grape sugar in 20 parts of ion exchange water was added. Then, 0.1 part of cumene hydroperoxide was added, thereby starting polymerization, and polymerization was carried out for one hour. Subsequently, 50 parts of ion exchange water, 0.7 part of potassium rosinate, 45 parts of styrene, 15 parts of acrylonitrile, 0.08 part of tert-dodecyl mercaptan, and 0.015 part of cumene hydroperoxide were added continuously over 4 hours. After performing polymerization for one hour, 0.2 part of 2,2'-methylene-bis(4-ethylene-6-tert-butylphenol) was added, thereby completing the polymerization. Magnesium sulfate was added to this latex, thereby coagulating the resin component. Then, washing with water and further drying were carried out, so that a polybutadiene-based graft copolymer was obtained. The graft ratio was 62% and the intrinsic viscosity [η] of the acetone-soluble fraction was 0.38 dl/g.

C1: AS-1

A polymerization vessel equipped with a stirrer was charged with 250 parts of water and 1.0 part of sodium palmitate. Following deoxygenation, the mixture was heated to 70° C. under stirring under a nitrogen flow. Furthermore, 0.4 part of sodium formaldehyde sulfoxylate, 0.0025 part of ferrous sulfate, and 0.01 part of disodium ethylenediaminetetraacetate were charged, and then a monomer mixture composed of 70 parts of α-methylstyrene, 25 parts of acrylonitrile, 5 parts of styrene, 0.5 part of tert-dodecyl mercaptan, and 0.2 part of cumene hydroperoxide was dropped continuously over 7 hours at a polymerization temperature of 70° C. After completion of the dropping, the polymerization temperature was raised to 75° C., and the polymerization was completed by continuing stirring for 1 hour, so that a latex of a copolymer was obtained. The polymerization conversion was 99%. Then, the resulting latex was coagulated by adding calcium chloride, and a copolymer in a powder form was obtained after washing, filtration, and drying steps. The intrinsic viscosity [η] of the acetone-soluble fraction of the resulting copolymer was 0.40 dl/g.

(2-2) Component [B] (Silicone Oil):

B-1: Dimethyl silicone oil; KF-96H-10,000 cSt (trade name: produced by Shin-Etsu Silicones), whose kinematic viscosity at 25° C. was 10000 cSt.

B-2: Dimethyl silicone oil; KF-96-100 cSt (trade name: produced by Shin-Etsu Silicones), whose kinematic viscosity at 25° C. was 100 cSt.

B-3: Dimethyl silicone oil; KF-96H-50,000 cSt (trade name: produced by Shin-Etsu Silicones), whose kinematic viscosity at 25° C. was 50,000 cSt.

B-4: Dimethyl silicone oil; KF-96L-5 cSt (trade name: produced by Shin-Etsu Silicones), whose kinematic viscosity at 25° C. was 5 cSt.

B-5: Dimethyl silicone oil; KF-96H-300,000 cSt (trade name: produced by Shin-Etsu Silicones), whose kinematic viscosity at 25° C. was 300,000 cSt.

B-6: Methylphenyl silicone oil; KF54 (trade name: produced by Shin-Etsu Silicones), whose kinematic viscosity at 25° C. was 400 cSt.

B-7: Methylphenyl silicone oil (produced by Shin-Etsu Silicones), whose kinematic viscosity at 25° C. was 6000 cSt.

B-8: Amino-modified silicone oil; TSF4700 (trade name: produced by Momentive Performance Materials Japan LLC), whose kinematic viscosity at 25° C. was 50 cSt.

B-9: Alkyl-aralkyl-modified silicone oil; XF42-334 (trade name: produced by Momentive Performance Materials Japan LLC), whose kinematic viscosity at 25° C. was 1300 cSt.

B-10: Polyether-modified silicone oil; SH8400 (trade name: produced by Dow Corning Toray Co., Ltd.), whose kinematic viscosity at 25° C. was 300 cSt.

B-11: Alkyl-modified silicone oil; TSF4421 (trade name: produced by Momentive Performance Materials Japan LLC), whose kinematic viscosity at 25° C. was 500 cSt.

B-12: Fatty acid ester-modified silicone oil; TSF410 (trade name: produced by Momentive Performance Materials Japan LLC), whose kinematic viscosity at 25° C. was 30 cSt.

(2-3) Additives:

E-1: Ethylene-bisstearic acid amide; KAOWAX EB-P (trade name: produced by Kao Corp.)

E-2:

1,3,5-Tris(3,5-di-tert-butyl-4-hydroxybenzyl)-s-triazine-2,4,6-(1H,3H,5H)trione; ADK STAB AO-20 (trade name: produced by ADEKA Corp.)

E-3: Bis(2,4-di-tert-butylphenyl)pentaerythritol diphosphite; ADK STAB PEP-24G (trade name: produced by ADEKA Corp.)

(2-4) Thermoplastic resin [Y] (in Table 1 and Table 2, referred to as "counter material")

Y1: Techno Polymer Co., Ltd., PC/ABS CK43 (HDT 95° C.)

Y2: Techno Polymer Co., Ltd., heat-resistant ABS E7301 (HDT 95° C.)

Y3: Prime Polymer Co., Ltd., Prime Polypro (staple fiber GFPP) V-7000 (HDT 150° C.)
Y4: Mitsubishi Rayon Co., Ltd., PMMA ACRYPET VH001 (HDT 100° C.)

Examples 1-33 and Comparative Examples 1-7

The above-described components [A], [B], [C], and [E] were mixed in the incorporation ratios shown in Table 1 and Table 2 by using a Henschel mixer, and then were kneaded in a twin screw extruder (manufactured by The Japan Steel Works, Ltd., TEX44, barrel preset temperature 250° C.), so that a thermoplastic resin composition [D] was pelletized. Using the resulting pellets, specimens for evaluation were molded.

On the other hand, a thermoplastic resin [Y] was pelletized in the same manner, and specimens for evaluation were molded using the resulting pellets. Using the specimens obtained, evaluations were carried out by the methods described above. The results of the evaluations described above are shown in Table 1 and Table 2.

TABLE 1

| Thermoplastic resin compositions [D], counter materials [Y] and physical properties | | | | | | Examples | | | | | | | |
|---|---|---|---|---|---|---|---|---|---|---|---|---|---|
| | | | | | | 1 | 2 | 3 | 4 | 5 | 6 | 7 | 8 |
| Thermoplastic resin compositions [D] | Rubber-reinforced vinyl resins [A] | A1: ABS-1 | Rubber polymer [a1] | Parts | | 12 | 16 | 8 | 16 | 12 | 16 | 16 | 1.8 |
| | | A2: AES-1 | Rubber polymer [a2] | | | 33 | 22 | 45 | 22 | | 22 | 22 | 22 |
| | | A2: AES-2 | Rubber polymer [a2] | | | | | | | 25 | | | |
| | | A1: ABS-2 | Rubber polymer [a1] | | | | | | | | | | |
| | (Co) polymer [C] | C1: AS-1 | AS resin | | | 55 | 62 | 47 | 62 | 63 | 62 | 62 | 62 |
| | Silicone oils [B] | B-1 | 10,000 cSt | | | 3 | 3 | 3 | 2 | 3 | | | 1 |
| | | B-2 | 100 cSt | | | | | | | | 3 | | |
| | | B-3 | 50,000 cSt | | | | | | | | | 3 | |
| | | B-4 | 5 cSt | | | | | | | | | | |
| | | B-5 | 300,000 cSt | | | | | | | | | | |
| | Additives [E] | E-1 | | | | 0.5 | 0.5 | 0.5 | 0.5 | 0.5 | 0.5 | 0.5 | 0.5 |
| | | E-2 | | | | 0.1 | 0.1 | 0.1 | 0.1 | 0.1 | 0.1 | 0.1 | 0.1 |
| | | E-3 | | | | 0.2 | 0.2 | 0.2 | 0.2 | 0.2 | 0.2 | 0.2 | 0.2 |
| | Rubber polymer | Rubber content | | % | | 14 | 14 | 15 | 14 | 15 | 14 | 14 | 14 |
| | | [a1]/([a1] + [a2]) | | | | 50 | 66 | 33 | 66 | 49 | 66 | 66 | 66 |
| | | [a2]/([a1] + [a2]) | | | | 50 | 34 | 67 | 34 | 51 | 34 | 34 | 34 |
| HDT (° C.) | | | | | | 93 | 95 | 91 | 95 | 95 | 95 | 95 | 96 |
| Counter material [Y] | | | | | | Y1 | Y1 | Y1 | Y1 | Y1 | Y1 | Y1 | Y1 |
| Squeaking noise evaluation I | | Practical use evaluation (200 hours) | | | | ○ | ○ | ○ | ○ | ○ | ○ | ○~Δ | ○ |
| | | Practical use evaluation (400 hours) | | | | ○ | ○ | ○ | ○~Δ | ○~Δ | Δ | Δ | Δ |
| Squeaking noise evaluation II | | Friction velocity dependency of friction coefficient (400 hours) | | | | 0 | 0 | 0 | −0.5 | −0.5 | −0.8 | −0.9 | −0.9 |
| Falling weight impact strength | | | | | J | 7 | 8 | 5 | 7 | 7 | 8 | 7 | 7 |

| Thermoplastic resin compositions [D], counter materials [Y] and physical properties | | | | | | Examples | Comp. Examples | | | | |
|---|---|---|---|---|---|---|---|---|---|---|---|
| | | | | | | 9 | 1 | 2 | 3 | 4 | 5 |
| Thermoplastic resin compositions [D] | Rubber-reinforced vinyl resins [A] | A1: ABS-1 | Rubber polymer [a1] | Parts | | | 25 | | 16 | 16 | 16 |
| | | A2: AES-1 | Rubber polymer [a2] | | | 50 | | 56 | 22 | 22 | 22 |
| | | A2: AES-2 | Rubber polymer [a2] | | | | | | | | |
| | | A1: ABS-2 | Rubber polymer [a1] | | | 50 | | | | | |
| | (Co) polymer [C] | C1: AS-1 | AS resin | | | | 75 | 44 | 62 | 62 | 62 |
| | Silicone oils [B] | B-1 | 10,000 cSt | | | 3 | 3 | 3 | 10 | | |
| | | B-2 | 100 cSt | | | | | | | | |
| | | B-3 | 50,000 cSt | | | | | | | | |
| | | B-4 | 5 cSt | | | | | | | 3 | |
| | | B-5 | 300,000 cSt | | | | | | | | 3 |
| | Additives [E] | E-1 | | | | | 0.5 | 0.5 | 0.5 | 0.5 | 0.5 |
| | | E-2 | | | | | 0.1 | 0.1 | 0.1 | 0.1 | 0.1 |
| | | E-3 | | | | | 0.2 | 0.2 | 0.2 | 0.2 | 0.2 |
| | Rubber polymer | Rubber content | | % | | 21 | 15 | 12 | 14 | 14 | 14 |
| | | [a1]/([a1] + [a2]) | | | | 48 | 100 | 0 | 66 | 66 | 66 |
| | | [a2]/([a1] + [a2]) | | | | 52 | 0 | 100 | 34 | 34 | 34 |
| HDT (° C.) | | | | | | 77 | 98 | 90 | ※1 | 95 | ※1 |
| Counter material [Y] | | | | | | Y1 | Y1 | Y1 | Y1 | Y1 | Y1 |
| Squeaking noise evaluation I | | Practical use evaluation (200 hours) | | | | ○ | x | ○ | ※2 | x | ※3 |
| | | Practical use evaluation (400 hours) | | | | ○ | x | ○ | ※2 | x | ※3 |
| Squeaking noise evaluation II | | Friction velocity dependency of friction coefficient (400 hours) | | | | 0 | −1.0 | 0 | ※2 | −1.7 | ※3 |
| Falling weight impact strength | | | | | J | 28 | 22 | 3 | ※2 | 6 | ※3 |

※1 No evaluation was made.
※2 No evaluation was made since silicone oil bled out to the surface of a molded article to lack in practicability.
※3 Melt-kneading was difficult and thus evaluation thereafter was not made.

TABLE 2

| Thermoplastic resin compositions [D], counter materials [Y] and physical properties | | | | | Examples | | | | | | | | |
|---|---|---|---|---|---|---|---|---|---|---|---|---|---|
| | | | | | 10 | 11 | 12 | 13 | 14 | 15 | 16 | 17 | 18 |
| Thermoplastic resin compositions [D] | Rubber-reinforced vinyl resins [A] | A1: ABS-1 | Rubber polymer [a1] | Parts | 12 | 12 | 12 | 12 | 12 | 12 | 12 | 12 | 12 |
| | | A2: AES-1 | Rubber polymer [a2] | | 33 | 33 | 33 | 33 | 33 | 33 | 33 | 33 | 33 |
| | | A2: AES-2 | Rubber polymer [a2] | | | | | | | | | | |
| | | A1: ABS-2 | Rubber polymer [a1] | | | | | | | | | | |
| | (Co) polymer [C] | C1: AS-1 | AS resin | | 55 | 55 | 55 | 55 | 55 | 55 | 55 | 55 | 55 |
| | Silicone oils [B] | B-6 | Methylphenyl 400 cSt | | 3 | 2 | 1 | 0.5 | | | | | |
| | | B-7 | Methylphenyl 6000 cSt | | | | | | 3 | 2 | 1 | 0.5 | |
| | | B-8 | Amino 50 cSt | | | | | | | | | | 3 |
| | | B-9 | Alkyl-aralkyl 1300 cSt | | | | | | | | | | |
| | | B-10 | Polyether 300 cSt | | | | | | | | | | |
| | | B-11 | Alkyl 500 cSt | | | | | | | | | | |
| | | B-12 | Fatty acid ester 30 cSt | | | | | | | | | | |
| | | B-1 | Dimethyl 10000 cSt | | | | | | | | | | |
| | Additives [E] | E-1 | | | 0.5 | 0.5 | 0.5 | 0.5 | 0.5 | 0.5 | 0.5 | 0.5 | 0.5 |
| | | E-2 | | | 0.1 | 0.1 | 0.1 | 0.1 | 0.1 | 0.1 | 0.1 | 0.1 | 0.1 |
| | | E-3 | | | 0.2 | 0.2 | 0.2 | 0.2 | 0.2 | 0.2 | 0.2 | 0.2 | 0.2 |
| | Rubber polymer | Rubber content | | % | 14 | 14 | 14 | 14 | 14 | 14 | 14 | 14 | 14 |
| | | [a1]/([a1] + [a2]) | | | 50 | 50 | 50 | 50 | 50 | 50 | 50 | 50 | 50 |
| | | [a2]/([a1] + [a2]) | | | 50 | 50 | 50 | 50 | 50 | 50 | 50 | 50 | 50 |
| HDT (° C.) | | | | | 93 | 93 | 94 | 94 | 93 | 93 | 94 | 94 | 93 |
| Counter material [Y] | | | | | Y1 | Y1 | Y1 | Y1 | Y1 | Y1 | Y1 | Y1 | Y1 |
| Squeaking noise evaluation I | | Practical use evaluation (400 hours) | | | ○ | ○ | ○ | ○ | ○ | ○ | ○ | ○ | ○ |
| | | Practical use evaluation (800 hours) | | | ○ | ○ | ○ | Δ | ○ | ○ | ○ | ○ | ○ |
| Squeaking noise evaluation III | | Frictional oscillation (0 hour) | | | 0-1 | 0-1 | 0-1 | 0-1 | 0-1 | 0-1 | 0-1 | 0-1 | 0-1 |
| | | Frictional oscillation (400 hours) | | | 0-2 | 0-2 | 0-3 | 0-3 | 0-1 | 0-2 | 0-2 | 0-2 | 0-1 |
| Molded appearance | | Jetting (10 mm/s) | | | ○ | ○ | ○ | ○ | ○ | ○ | ○ | ○ | Δ |
| | | Jetting (30 mm/s) | | | ○ | ○ | ○ | ○ | ○ | ○ | ○ | ○ | Δ |
| | | Jetting (50 mm/s) | | | ○ | ○ | ○ | ○ | ○ | ○ | ○ | ○ | x |
| Falling weight impact strength | | | | J | 8 | 8 | 7 | 7 | 8 | 8 | 8 | 7 | 8 |

| Thermoplastic resin compositions [D], counter materials [Y] and physical properties | | | | | Examples | | | | | | | | |
|---|---|---|---|---|---|---|---|---|---|---|---|---|---|
| | | | | | 19 | 20 | 21 | 22 | 23 | 24 | 25 | 26 | 27 |
| Thermoplastic resin compositions [D] | Rubber-reinforced vinyl resins [A] | A1: ABS-1 | Rubber polymer [a1] | Parts | | 20 | 17 | 8 | 12 | 12 | 12 | 25 | |
| | | A2: AES-1 | Rubber polymer [a2] | | 65 | 55 | 23 | 45 | 33 | 33 | 33 | | 56 |
| | | A2: AES-2 | Rubber polymer [a2] | | | | | | | | | | |
| | | A1: ABS-2 | Rubber polymer [a1] | | 35 | | | | | | | | |
| | (Co) polymer [C] | C1: AS-1 | AS resin | | | 25 | 60 | 47 | 55 | 55 | 55 | 75 | 44 |
| | Silicone oils [B] | B-6 | Methylphenyl 400 cSt | | | | | | | 3 | | | |
| | | B-7 | Methylphenyl 6000 cSt | | 3 | 3 | 3 | 3 | | | | 3 | 3 |
| | | B-8 | Amino 50 cSt | | | | | | | | | | |
| | | B-9 | Alkyl-aralkyl 1300cSt | | | | | | | | | | |
| | | B-10 | Polyether 300 cSt | | | | | | | | | | |
| | | B-11 | Alkyl 500 cSt | | | | | | | | | | |
| | | B-12 | Fatty acid ester 30 cSt | | | | | | | | 3 | | |
| | | B-1 | Dimethyl 10000 cSt | | | | | | | | | | |
| | Additives [E] | E-1 | | | 0.5 | 0.5 | 0.5 | 0.5 | 0.5 | 0.5 | 0.5 | 0.5 | 0.5 |
| | | E-2 | | | 0.1 | 0.1 | 0.1 | 0.1 | 0.1 | 0.1 | 0.1 | 0.1 | 0.1 |
| | | E-3 | | | 0.2 | 0.2 | 0.2 | 0.2 | 0.2 | 0.2 | 0.2 | 0.2 | 0.2 |
| | Rubber polymer | Rubber content | | % | 15 | 21 | 24 | 15 | 15 | 14 | 14 | 15 | 12 |
| | | [a1]/([a1] + [a2]) | | | 49 | 33 | 50 | 67 | 33 | 50 | 50 | 100 | 0 |
| | | [a2]/([a1] + [a2]) | | | 51 | 67 | 50 | 33 | 67 | 50 | 50 | 0 | 100 |
| HDT (° C.) | | | | | 93 | 94 | 95 | 77 | 85 | 94 | 91 | 93 | 90 |
| Counter material [Y] | | | | | Y1 | Y1 | Y1 | Y1 | Y1 | Y1 | Y1 | Y1 | Y2 |
| Squeaking noise evaluation I | | Practical use evaluation (400 hours) | | | ○ | ○ | ○ | ○ | ○ | ○ | ○ | ○ | ○ |
| | | Practical use evaluation (800 hours) | | | ○ | ○ | ○ | Δ | ○ | ○ | ○ | ○ | ○ |
| Squeaking noise evaluation III | | Frictional oscillation (0 hour) | | | 0-1 | 0-1 | 0-1 | 0-1 | 0-1 | 0-1 | 0-1 | 0-1 | 0-1 |
| | | Frictional oscillation (400 hours) | | | 0-2 | 0-3 | 0-3 | 0-1 | 0-2 | 0-2 | 0-1 | 1-2 | 0-1 |
| Molded appearance | | Jetting (10 mm/s) | | | Δ | Δ | ○ | ○ | ○ | ○ | ○ | ○ | ○ |
| | | Jetting (30 mm/s) | | | Δ | Δ | ○ | ○ | ○ | ○ | ○ | ○ | ○ |
| | | Jetting (50 mm/s) | | | x | Δ | ○ | ○ | ○ | ○ | ○ | ○ | ○ |
| Falling weight impact strength | | | | J | 8 | 7 | 9 | 15 | 25 | 15 | 6 | 8 | 3 |

| Thermoplastic resin compositions [D], counter materials [Y] and physical properties | | | | | Examples | | | | | | Comp. Examples | |
|---|---|---|---|---|---|---|---|---|---|---|---|---|
| | | | | | 28 | 29 | 30 | 31 | 32 | 33 | 6 | 7 |
| Thermoplastic resin compositions [D] | Rubber-reinforced vinyl resins [A] | A1: ABS-1 | Rubber polymer [a1] | Parts | 12 | 12 | 12 | 12 | 12 | 12 | 25 | |
| | | A2: AES-1 | Rubber polymer [a2] | | 33 | 33 | 33 | 33 | 33 | 33 | | 56 |
| | | A2: AES-2 | Rubber polymer [a2] | | | | | | | | | |
| | | A1: ABS-2 | Rubber polymer [a1] | | | | | | | | | |
| | (Co) polymer [C] | C1: AS-1 | AS resin | | 55 | 55 | 55 | 55 | 55 | 55 | 75 | 44 |
| | Silicone oils [B] | B-6 | Methylphenyl 400 cSt | | 3 | 3 | | | | | | |
| | | B-7 | Methylphenyl 6000 cSt | | | | | | | | 3 | 3 |
| | | B-8 | Amino 50 cSt | | | | | | | | | |

TABLE 2-continued

| | | | | | | | | | | | |
|---|---|---|---|---|---|---|---|---|---|---|---|
| | B-9 | Alkyl-aralkyl 1300cSt | | | | | | | | | |
| | B-10 | Polyether 300 cSt | | | | 3 | | | | | |
| | B-11 | Alkyl 500 cSt | | | | | 3 | | | | |
| | B-12 | Fatty acid ester 30 cSt | | | | | | 3 | | | |
| | B-1 | Dimethyl 10000 cSt | | | | | | | 3 | | |
| Additives [E] | E-1 | | | 0.5 | 0.5 | 0.5 | 0.5 | 0.5 | 0.5 | 0.5 | 0.5 |
| | E-2 | | | 0.1 | 0.1 | 0.1 | 0.1 | 0.1 | 0.1 | 0.1 | 0.1 |
| | E-3 | | | 0.2 | 0.2 | 0.2 | 0.2 | 0.2 | 0.2 | 0.2 | 0.2 |
| Rubber polymer | Rubber content | | % | 14 | 14 | 14 | 14 | 14 | 14 | 15 | 12 |
| | [a1]/([a1] + [a2]) | | | 50 | 50 | 50 | 50 | 50 | 50 | 100 | 0 |
| | [a2]/([a1] + [a2]) | | | 50 | 50 | 50 | 50 | 50 | 50 | 0 | 100 |
| HDT (° C.) | | | | 93 | 93 | 93 | 93 | 93 | 93 | 98 | 90 |
| Counter material [Y] | | | | Y3 | Y4 | Y1 | Y1 | Y1 | Y1 | Y1 | Y1 |
| Squeaking noise evaluation I | Practical use evaluation (400 hours) | | | ○ | ○ | ○ | ○ | ○ | ○ | ○ | ○ |
| | Practical use evaluation (800 hours) | | | ○ | ○ | x | x | x | x | x | ○ |
| Squeaking noise evaluation III | Frictional oscillation (0 hour) | | | 0-1 | 0-1 | 0-1 | 1-2 | 1-2 | 1-3 | 1-3 | 0-1 |
| | Frictional oscillation (400 hours) | | | 0-2 | 0-2 | 1-1 | 1-3 | 1-3 | 1-3 | 1-3 | 0-1 |
| Molded appearance | Jetting (10 mm/s) | | | ○ | ○ | x | x | x | x | x | ○ |
| | Jetting (30 mm/s) | | | ○ | ○ | x | x | x | x | x | ○ |
| | Jetting (50 mm/s) | | | ○ | ○ | x | x | x | x | x | ○ |
| Falling weight impact strength | | | J | 8 | 8 | 8 | 8 | 8 | 7 | 22 | 3 |

As is obvious from Table 1 and Table 2, the thermoplastic resin compositions [D] of the present invention represented by Examples 1 to 33 can provide molded articles with which squeaking noises are reduced and which have impact resistance in good balance. Particularly, Examples 10 to 29 containing a methylphenyl silicone oil, an amino silicone oil, and an alkyl-aralkyl silicone oil as the silicone oil [B] had an effect of reducing squeaking noises, impact resistance, and molded appearance in good balance, and especially the thermoplastic resin compositions [D] of Examples 10 to 17 and 22 to 20 containing methylphenyl silicone oil are remarkably excellent.

Conversely, Comparative Example 1, which is an example of containing no ethylene-α-olefin rubber polymer [a2], is inferior in the effect of reducing squeaking noises. Comparative Example 2, which is an example containing no diene rubber polymer [a1], is inferior in falling weight impact strength. In Comparative Example 3, which is an example in which the incorporation amount of the silicone oil [B] of the present invention was excessively large, it was difficult to carry out melt-kneading and the silicone oil bled out to the surface of the molded article, which was therefore unusable for practical use, and therefore, no evaluation was done. Comparative Example 4, which is an example using a silicone oil failing to satisfy the kinematic viscosity in the present invention, was poor in an effect of reducing squeaking noises because of an excessively low kinematic viscosity. In Comparative Example 5, which is an example using a silicone oil failing to satisfy the kinematic viscosity in the present invention, it was difficult to carry out melt-kneading because of an excessively high kinematic viscosity, and therefore, no evaluation was done. Comparative Example 6 is an example containing no ethylene-α-olefin rubber polymer [a2], and Comparative Example 7 is an example containing no diene rubber polymer [a1], and in both cases, even though a preferred methylphenyl silicone oil was incorporated, it was impossible to obtain a molded article having an effect of reducing squeaking noises, molded appearance and impact resistance with good balance.

INDUSTRIAL APPLICABILITY

The automobile interior part of the present invention can provide an automobile interior part made of a thermoplastic resin composition, the automobile interior part being characterized in that generation of squeaking noises that are generated when members rub against each other is remarkably reduced, that an effect of reducing squeaking noises is maintained without deterioration even when being placed under high temperatures for a long time, and that the automobile interior part is superior in impact resistance and molded appearance. It can be used suitably for a ventilator for a car, an air-conditioner for a car, and so on. In particular, it can be used suitably for parts having an engaging portion with other members.

DESCRIPTION OF REFERENCE SIGNS

M Object
V Driving speed
μs Coefficient of static friction
μl Lower end of saw wavy form
Δμ μs-μl

The invention claimed is:
1. An automobile interior assembly comprising:
a first member that is an automobile interior part made of a thermoplastic resin composition [D] comprising:
100 parts by mass of a rubber-reinforced vinyl resin [A], and
0.2 to 8 parts by mass of a silicone oil [B] having a kinematic viscosity at 25° C. of 30 to 50,000 cSt,
wherein:
the rubber-reinforced vinyl resin [A] comprises:
a rubber-reinforced vinyl resin [A1] containing a diene rubber polymer [a1], which is a polybutadiene, wherein the rubber-reinforced vinyl resin [A1] is a butadiene-acrylonitrile-styrene copolymer, and
a rubber-reinforced vinyl resin [A2] containing an ethylene-α-olefin rubber polymer [a2] which is selected from the group consisting of an ethylene-propylene copolymer and an ethylene-propylene-dicyclopentadiene copolymer, wherein the rubber-reinforced vinyl resin [A2] is selected from the group consisting of an ethylene/propylene-acrylonitrile-styrene copolymer and an ethylene/propylene/dicyclopentadiene-acrylonitrile-styrene copolymer,
a total amount of the diene rubber polymer [a1] and the ethylene-α-olefin rubber polymer [a2] is 5 to 24% by mass, based on 100% by mass of the whole amount of the rubber-reinforced vinyl resin [A], and a mass ratio of the diene rubber polymer [a1] to the ethylene-α-olefin rubber polymer [a2], [a1]:[a2], is 25 to 75:75 to 25; and wherein the silicone oil [B] is at least one silicone oil selected from the group consisting of a methylphenyl silicone oil, an alkyl-aralkyl-modified silicone oil, an amino-modified silicone oil, a polyether-modified silicone oil, an alkyl-modified silicone oil, a fatty acid ester-modified silicone oil and a dimethyl silicone oil, and a second member that is a molded article of a thermoplastic resin [Y] selected from the group consisting of the following Y1 to Y4:

Y1: a polycarbonate/rubber-reinforced styrene resin alloy having an HDT of 85° C. or higher, Y2: a styrene resin having an HDT of 85° C. or higher, excluding the above Y1, Y3: a polyolefin resin having an HDT of 85° C. or higher, Y4: a methacrylic resin having an HDT of 85° C. or higher, and wherein the first member and the second member are in contact with and can rub against each other.

2. The automobile interior assembly according to claim 1, wherein the rubber-reinforced vinyl resin [A] contains a mixture composed of the rubber-reinforced vinyl resin [A1] obtained by polymerizing a vinyl monomer [b1] consisting of acrylonitrile and styrene in the presence of the diene rubber polymer [a1], the rubber-reinforced vinyl resin [A2] obtained by polymerizing a vinyl monomer [b2] consisting of acrylonitrile and styrene in the presence of the ethylene-α-olefin rubber polymer [a2] selected from the group consisting of an ethylene-propylene copolymer and an ethylene-propylene-dicyclopentadiene copolymer, and a (co)polymer [C] of a vinyl monomer [b3].

3. The automobile interior assembly according to claim 2, wherein a mass ratio of ethylene to α-olefin in the ethylene-α-olefin rubber polymer [a2] is 5 to 95:95 to 5.

4. The automobile interior assembly according to claim 2, wherein the ethylene-α-olefin rubber polymer [a2] is the ethylene-propylene copolymer.

5. The automobile interior assembly according to claim 2, wherein the silicone oil [B] is at least one silicone oil selected from the group consisting of methylphenyl silicone oil, an alkyl-aralkyl-modified silicone oil, and an amino-modified silicone oil.

6. The automobile interior assembly according to claim 5, wherein the silicone oil [B] is methylphenyl silicone oil.

7. The automobile interior assembly according to claim 2, wherein the automobile interior part is used in a ventilator for an automobile.

8. The automobile interior assembly according to claim 2, wherein the automobile interior part is used in an air-conditioner for an automobile.

9. The automobile interior assembly according to claim 1, wherein a mass ratio of ethylene to αolefin in the ethylene-α-olefin rubber polymer [a2] is 5 to 95:95 to 5.

10. The automobile interior assembly according to claim 1, wherein the ethylene-α-olefin rubber polymer [a2] is the ethylene-propylene copolymer.

11. The automobile interior assembly according to claim 1, wherein the silicone oil [B] is at least one silicone oil selected from the group consisting of methylphenyl silicone oil, an alkyl-aralkyl-modified silicone oil, and an amino-modified silicone oil.

12. The automobile interior assembly according to claim 11, wherein the silicone oil [B] is methylphenyl silicone oil.

13. The automobile interior assembly according to claim 1, wherein the automobile interior part is used in a ventilator for an automobile.

14. The automobile interior assembly according to claim 1, wherein the automobile interior part is used in an air-conditioner for an automobile.

* * * * *